United States Patent
Hibi et al.

(10) Patent No.: US 7,287,881 B2
(45) Date of Patent: Oct. 30, 2007

(54) LIGHT DEFLECTOR AND REAR-PROJECTION SCREEN

(75) Inventors: Taketoshi Hibi, Tokyo (JP); Yuzo Nakano, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 259 days.

(21) Appl. No.: 11/027,991

(22) Filed: Jan. 4, 2005

(65) Prior Publication Data
US 2005/0146880 A1  Jul. 7, 2005

(30) Foreign Application Priority Data
Jan. 5, 2004  (JP) ............... 2004-000275

(51) Int. Cl.
*F21V 7/04* (2006.01)
(52) U.S. Cl. ............... 362/346; 362/297; 362/347; 362/341
(58) Field of Classification Search ........ 362/297–298, 362/346–347, 350, 341; 359/459, 613, 627, 359/851, 856–858
See application file for complete search history.

(56) References Cited

U.S. PATENT DOCUMENTS

| | | | | |
|---|---|---|---|---|
| 1,446,892 A | * | 2/1923 | Fay | 362/291 |
| 2,819,649 A | * | 1/1958 | McLeod et al. | 362/298 |
| 3,115,310 A | * | 12/1963 | Hofman | 362/298 |
| 4,096,555 A | * | 6/1978 | Lasker | 362/302 |
| 5,254,388 A | | 10/1993 | Melby et al. | |
| 6,650,481 B2 | | 11/2003 | Osawa et al. | |
| 7,014,342 B2 | * | 3/2006 | Chang et al. | 362/299 |

FOREIGN PATENT DOCUMENTS

| | | |
|---|---|---|
| JP | 61-52601 A | 3/1986 |
| JP | 7-64189 A | 3/1995 |
| JP | 2002-196422 A | 7/2002 |
| JP | 2002-311211 A | 10/2002 |

\* cited by examiner

*Primary Examiner*—Renee Luebke
*Assistant Examiner*—Robert May
(74) *Attorney, Agent, or Firm*—Birch, Stewart, Kolasch & Birch, LLP

(57) ABSTRACT

The presented invention relates to a light deflector. The light deflector defining a light-incident side and a light-exiting side, the deflector comprising a plurality of reflector(42) arranged side-by-side in a predetermined orientation, each reflector having, a first reflection face(42A), provided on the deflector light-incident side, for reflecting incident light so as to focus the light, and a second reflection face (42B), provided on the deflector light-exiting side, for reflecting light reflected by the first reflection face of an adjacent reflection means(42). In accordance with the present invention, light utilization efficiency can be raised.

11 Claims, 15 Drawing Sheets

| Fresnel lens sheet | provided | | not provided | |
|---|---|---|---|---|
| position | P7 | P8 | P7 | P8 |
| $\theta$ D [deg] | 90 | 45 | 90 | 45 |
| $\theta$ H [deg] | 0 | 45 | 0 | 45 |
| $\theta$ V [deg] | 45 | 45 | 45 | 45 |
| $\theta$ in [deg] | 0 | 0 | 45 | 54.7 |
| $\theta$ SC [deg] | 0 | 0 | 28.1 | 33.0 |
| $\theta$ HSC [deg] | 0 ($=\theta$H) | 45 ($=\theta$H) | 0 | 24.6 |
| $\theta$ VSC [deg] | 45 ($=\theta$V) | 45 ($=\theta$V) | 28.1 | 24.6 |

141 142

LIGHT DEFLECTOR AND REAR-PROJECTION SCREEN

BACKGROUND OF THE INVENTION

1. Field of the Invention

The present invention relates to light deflectors that change the traveling direction of light projected from behind, and to rear-projection screens.

2. Description of the Related Art

A conventional rear-projection screen is configured in such a way that the light exiting face of a Fresnel lens sheet provided with circular Fresnel lenses and the light incident face of a lenticular lens sheet straightly and vertically provided with cylindrical lenses (the vertical orientation along the screen) are faced closely each other (for example, Patent Document 1).

Another conventional rear-projection screen, which includes three lens sheets, that is, a lenticular lens sheet having cylindrical lenses that are straightly and vertically provided on both the light incident and light exiting face sides, a linear Fresnel lens sheet having Fresnel lenses that is straightly and horizontally provided (the horizontal orientation along a screen) on its light exiting face, and a circular Fresnel lens sheet having circular Fresnel lenses on its light exiting face, is configured in such a way that the lenticular lens sheet, the linear Fresnel lens sheet, and the circular Fresnel lens sheet are arranged in this order from a viewer side (for example, Patent Document 2).

Moreover, another conventional rear-projection screen, in order to reduce light losses, is composed of a set of, a prism piece in which a part of an incident light beam through one of its lens faces exits after having fully reflected on another lens faces, and a prism piece in which an incident light beam through its lens face exits after refracting; two kinds of these prism pieces are arranged so as to be alternately placed over the entire sheet (for example, Patent Document 3).

Moreover, another conventional rear-projection screen is, in order to reduce light losses in lenticular lenses, composed of a lens sheet having, a lens layer in which a plurality of unit lenses that can emits light from their light exit portions after a part of incident light being fully reflected by their fully reflecting portions are arranged one-dimensionally or two-dimensionally on the light exit portion, and a reflection reducing layer, in which light beams from its light incident portion are reflected and light beams from its light exit portion are reduced, provided on the fully reflecting portions for example, Patent Document 4).

Furthermore, in another conventional rear-projection screen, a light absorber is formed, which has a function for reducing light from outside and ghost light that travel obliquely in the screen (for example, Patent Document 5).

[Patent Document 1]
Japanese Laid-Open Patent Publication 196,422/2002 (on page 6, FIG. 2)

[Patent Document 2]
Japanese Laid-Open Patent Publication 64,189/1995 (on page 11, FIG. 2)

[Patent Document 3]
Japanese Laid-Open Patent Publication 52,601/1986 (on page 5, FIG. 4)

[Patent Document 4]
Japanese Laid-Open Patent Publication 311,211/2002 (on page 9, FIG. 3)

[Patent Document 5]
U.S. Pat. No. 5,254,388 (Sheet 1 of 2, FIG. 1)

SUMMARY OF THE INVENTION

However, in the Fresnel lens and cylindrical lens of the rear-projection screen as described above, because a light traveling direction is changed using their refraction, the chromatic aberration due to the refractive index or wavelength dispersion of the materials that compose the lens occurs. Therefore, a problem has been that, when images projected through the rear-projection screen are viewed, the color of the images varies depending on positions (angles) where a viewer views the images.

In the refraction faces of the Fresnel lens and cylindrical lens, because reflected light as well as the refracted light are necessarily generated, light passing through the rear-projection screen is reduced. Therefore, a problem has occurred in which clearness of the images is lost by ghost light or stray light generated due to the reflected light, and thereby the projected images become dark.

Moreover, in a case in which the Fresnel lens is composed of a refraction prism, when the angle between the light projected direction by a projecting means and the direction perpendicular to the projection face of the screen (hereinafter referred to as a projection angle or a projected angle) is equal to or smaller than 40 degrees, the screen transmittance for the projected light can be maintained at more than 85%; however, when the projection angle exceeds 40 degrees, because the projected light reflected on the refraction face increases, and the transmitted light-beam intensity decreases in accordance with the screen transmittance decreasing, images especially in the perimeter portion of the screen become dark, and the clearness of the projected images is also lost due to the stray light reflected on the refraction face increasing.

Furthermore, in a case in which the Fresnel lens is composed of a fully reflecting prism, although light losses on the refraction face are reduced, it can be used only under the condition that the projection light is projected at as a sharp angle as 45 degrees or over. Therefore, it has been difficult to design the light projection means. In addition, because incident faces of prism patterns of the fully reflecting prism are refractive, on the refraction faces, stray light and ghost light have sometimes occurred.

If the lenticular lens sheet is composed of a reflection prism provided on the exiting face side and a transparent sheet, light must not return from the exiting face to the incident face side. However, in order to allow the light not to return to the incident face side, the shape of the reflection prism adopted is limited; therefore, it has been difficult to obtain diffusion characteristics needed for the lenticular lens sheet.

Moreover, in order to prevent the ghost light, if a blind-type light absorbing sheet is used, light losses, due to a thickness effect thereof, occur; consequently, there has been a problem in that the entire screen becomes dark.

Accordingly, an objective of the present invention, which has been made to solve the foregoing problem, is to provide a light deflector and a rear-projection screen that can display clear images over the entire screen by light utilization efficiency being raised through a simple structure, and an effect of ghost light or stray light being prevented.

A light deflector according to the present invention includes: a plurality of reflection means arranged side-by-side in a predetermined orientation having a first reflection face, provided on the light-incident side, for reflecting light so as to focus the light, and a second reflection face, provided on the exiting side, for reflecting light reflected by the first reflection face, the plurality of reflection means being arranged so that light reflected by the first reflection face of one of the plural reflection means is reflected by the second reflection face of another reflection means adjacent to the one of the reflection means.

As described above, according to the light deflector and the rear-projection screen of the present invention, because reflected light is generated extremely less than that in conventional rear-projection screens, light utilization efficiency can be raised; consequently, clear images can be displayed.

BRIEF DESCRIPTION OF THE DRAWINGS

FIG. 15 is an explanatory view for explaining light incident angles and light traveling angles after the light is incident on the rear-projection screen according to Embodiment 3 of the present invention.

DETAILED DESCRIPTION OF THE PREFERRED EMBODIMENTS

Embodiment 1

Figure 1:
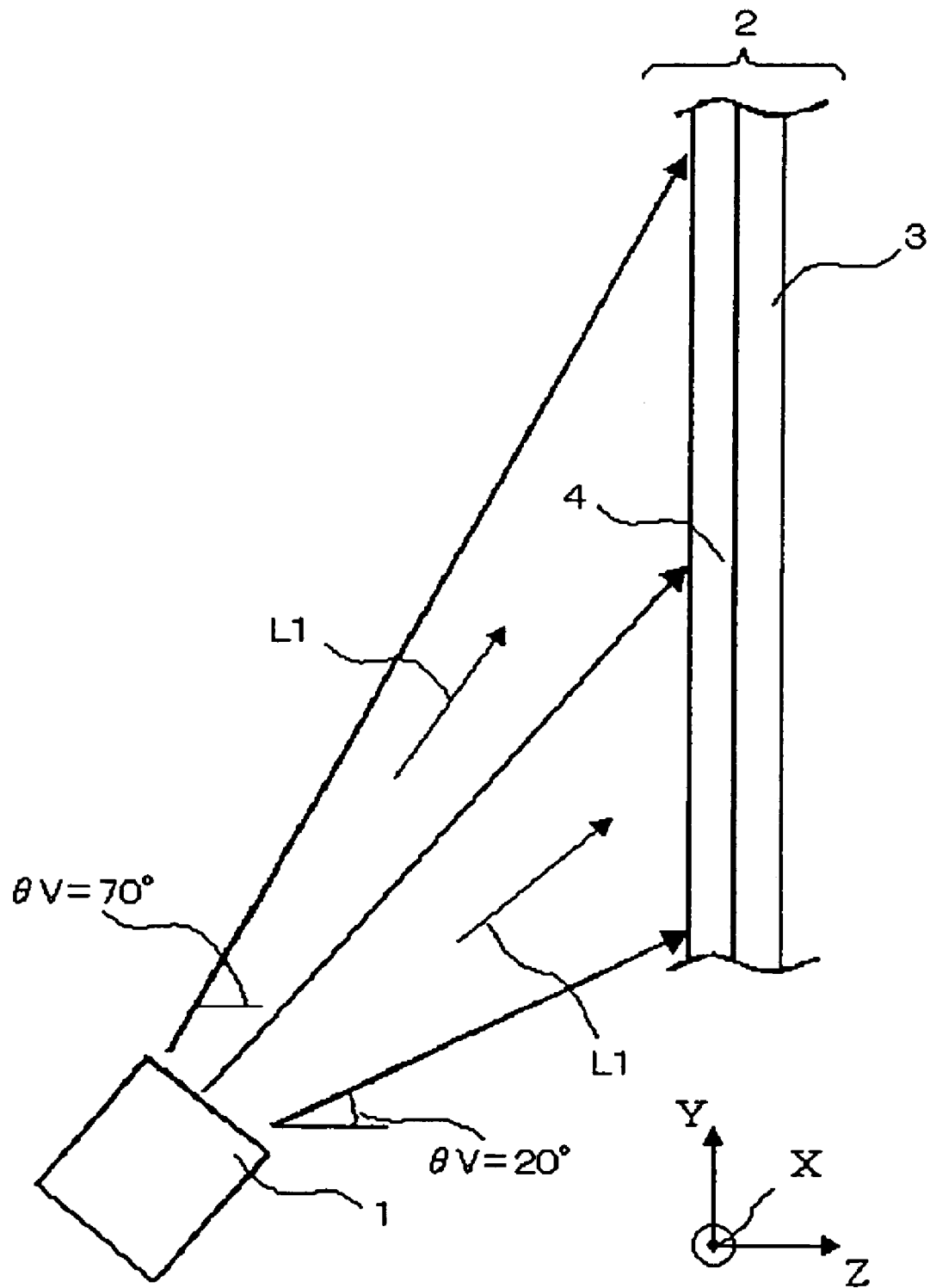
FIG. 1 is a side view illustrating a rear-projection screen according to Embodiment 1 of the present invention.

FIG. 1 is a side view illustrating a rear-projection screen 2 according to Embodiment 1. In FIG. 1, light projected from a light projection means 1 (hereinafter referred to as projected light) spreadingly travels toward the rear-projection screen 2 along the light traveling direction (L1 in FIG. 1). Thereby, an image projected by the light projection means 1 is enlarged and projected onto the rear-projection screen 2. The rear-projection screen 2 is composed of a light deflector 4 and a lenticular lens sheet 3; thus, the light projected from the light projection means 1 is at first incident on the light deflector 4. Here, in the following explanation, light being incident on elements such as the light deflector 4 and the lenticular lens sheet 3 that compose the rear-projection screen 2 is referred to as incident light, while light exiting from the elements is referred to as exiting light. A face on which the incident light is incident is referred to as an incident face, while a face from which the light exits is referred to as an exiting face. Moreover, explanations will be made, providing the light projection means 1 and the rear-projection screen 2 are placed in air.

The light deflector 4 changes the traveling direction of the incident light, and emits from the exiting face the exiting light that travels approximately in parallel with the normal direction. Then, the light exiting from the exiting face of the light deflector 4 is incident on the lenticular lens sheet 3. The incident light that has been incident on the lenticular lens sheet 3, to which horizontal and vertical directivities suited for its application such as a projection type TV are given, exits from the exiting face of the lenticular lens sheet 3 as exiting light. A viewer (not illustrated) views the exiting light from the exiting face of the lenticular lens sheet 3; as a result, the viewer can view the image projected by the light projection means 1.

Figure 2:
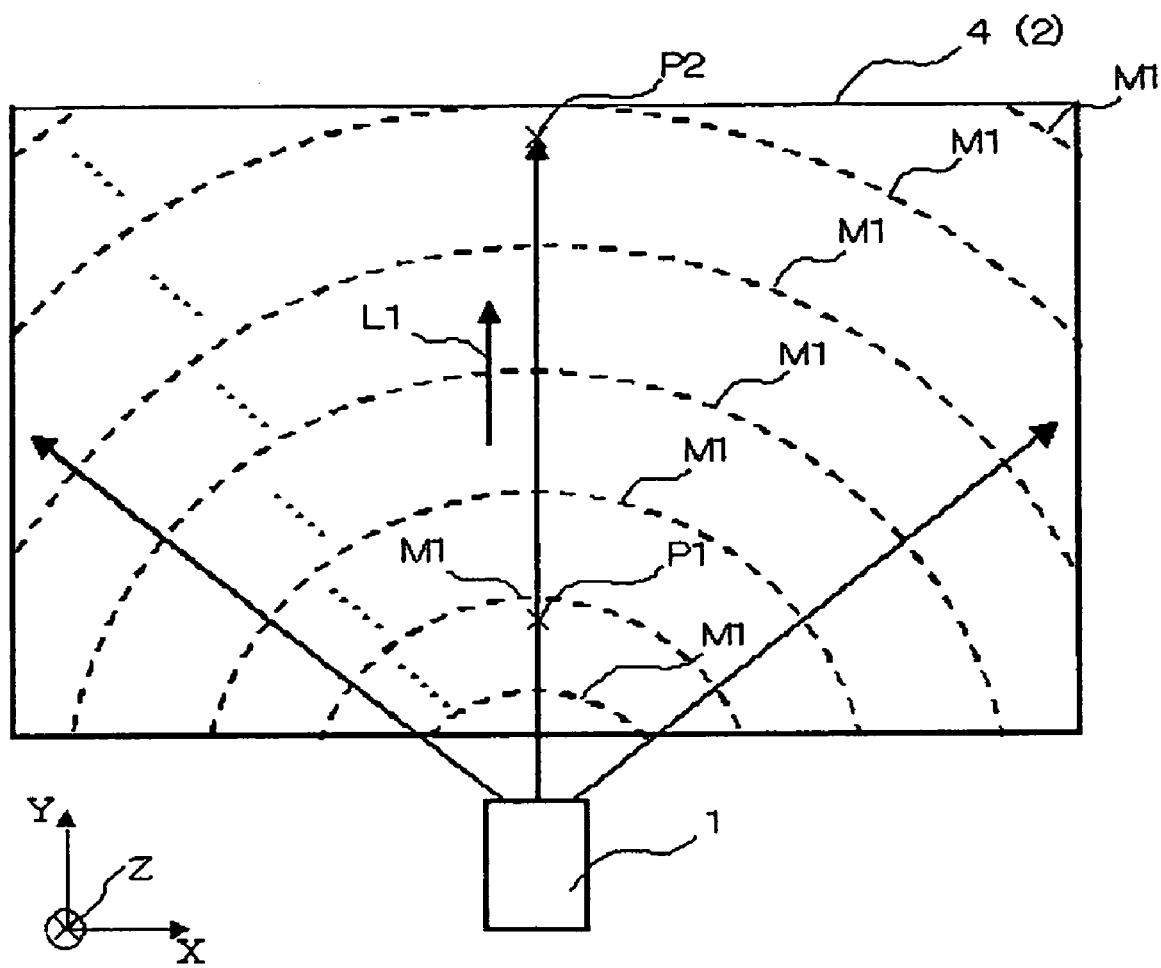
FIG. 2 is an explanatory view for explaining a case in which the rear-projection screen according to Embodiment 1 of the present invention is viewed from a light projection means side.

FIG. 2 is an explanatory view for explaining the rear-projection screen 2 viewed from the side of the light projection means 1. As illustrated in FIG. 2, when the rear-projection screen 2 is viewed from the side of the light projection means 1, the light deflector 4 is seen in the viewer side. In the light deflector 4, a reflection means (a reflection means 42 described later) for deflecting the incident light is formed along concentric circles M1 in FIG. 2. That is, the concentric circles M1 represent extending orientations of the cylindrical reflection means provided in the light deflector 4. Here, a plurality of the concentric circles illustrated in FIG. 2 each is denoted as symbol M1 in the following explanation.

Moreover, the repeating period of the reflection means 42 in the light deflector 4, that is, the interval of symbol M1, is made sufficiently short. Specifically, it must be set shorter than a pixel size on the screen. For example, in XGA (extended graphics array), because the number of the pixels in the screen vertical orientation is 768 pixels, when the height of the screen is 1 m, the vertical length per pixel becomes approximately 1.3 mm. Therefore, in this case, the interval must be shorter than at least 1.3 mm; practically, the interval of the symbol M1 is preferably made approximately from 0.05 mm to 0.5 mm.

Figure 3:
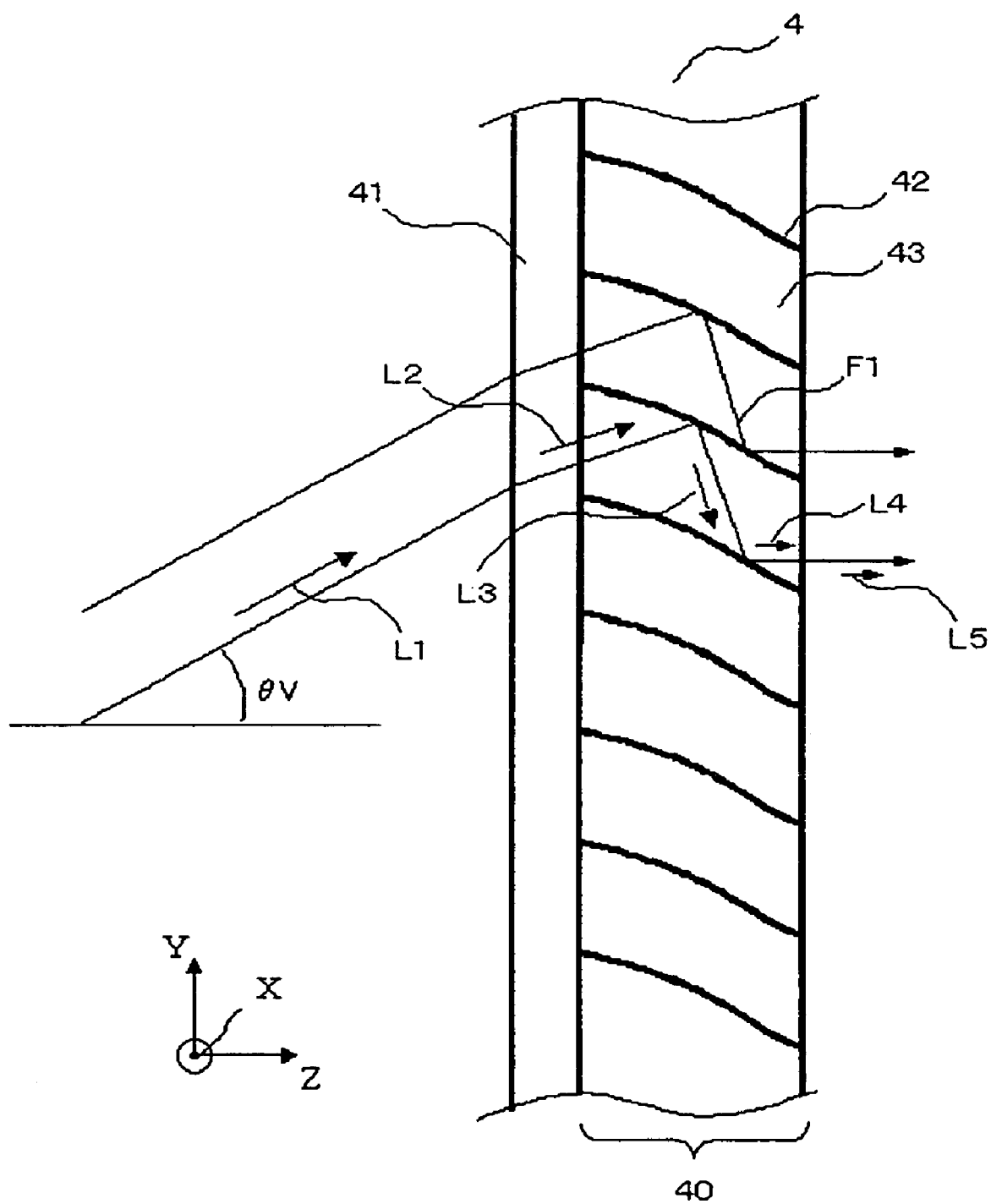
FIG. 3 is a magnified cross-sectional view illustratively magnifying a cross-section along the Y-axis of the rear-projection screen according to Embodiment 1 of the present invention is viewed.

FIG. 3 illustrates a magnified cross-sectional view in which a cross-section along the Y-axis of the light deflector 4 is viewed from the X-axis direction. In FIG. 3, the incident light that is incident from the Z-axis direction at a predetermined angle $\theta V$ with respect to the Z-axis illustrated in FIG. 3, is deflected, after having passed through a transparent sheet, by being reflected on the reflection means 42, and passes through the light deflector 4.

Here, symbols L1-L5 in FIG. 3 represent light traveling directions on the path until the incident light exits from the light deflector 4 as exiting light. Specifically explaining, symbol L1 denotes a light traveling direction of the projected light (incident light), symbol L2 denotes a light traveling direction traveling in the transparent sheet 41, symbol L3 denotes a traveling direction of light reflected by the reflection means 42, symbol L4 denotes a light traveling direction in which the light reflected by the reflection means 42 is re-reflected by the other reflection means 42 that is placed adjacent to one another, and symbol L5 denotes a light traveling direction of the exiting light. Here, because symbol L3 differs depending on which position on the reflection means 42 the traveling light along symbol L2 has been reflected, a plurality of symbols L3 practically exists; however, in FIG. 3, one of the plurality of symbols L3 is represented as an example.

Here, the configuration of the light deflector 4 is explained. In the light deflector 4, the transparent sheet 41 is formed on the incident face, and a light deflecting portion 40 is formed on the transparent sheet 41. In the light deflecting portion 40, a plurality of the reflection means 42 is provided along the Y-axis in FIG. 3, and a space between the adjacent reflection means 42 is filled with transparent material 43. Moreover, the reflection means 42 are arranged along the concentric circles M1 in FIG. 2.

Here, as the transparent sheet 41, any transparent material may be used as far as the incident light can pass therethrough, and the thickness of the sheet is not especially limited. For example, in a case in which an acrylate or a PET (poly(ethylene terephthalate)) film having thickness from 100 μm to 300 μm is used, because a flexible film can be obtained, the rear-projection screen 2 that is lightweight, safe and crack-proof can be obtained. Moreover, for example, acrylic sheet material having thickness approximately from 1 mm to 3 mm may be used; in this case, because the rigidity of the light deflector 4 can be increased, a screen that is easy-to-maintain its planarity without giving any tension can be obtained. As described above, the thickness of the transparent sheet 41 may be suitably selected in accordance with a method for supporting the rear-projection screen 2.

Here, the incident angle θV at which the incident light is incident on the light deflector 4 becomes different values depending on the radii of the concentric circles M1, because the angle of the projected light traveling direction L1 with respect to the Z-axis in the figure distributes in a specified range determined by the optical design of the light projection means. FIG. 1 represents an example when the incident angle θV is in the range from 20 degrees to 70 degrees. Here, if the projected light traveling direction, that is, the direction L1 differs, the traveling direction L2 of the light having passed through the transparent sheet 41 also differs.

Figure 4:
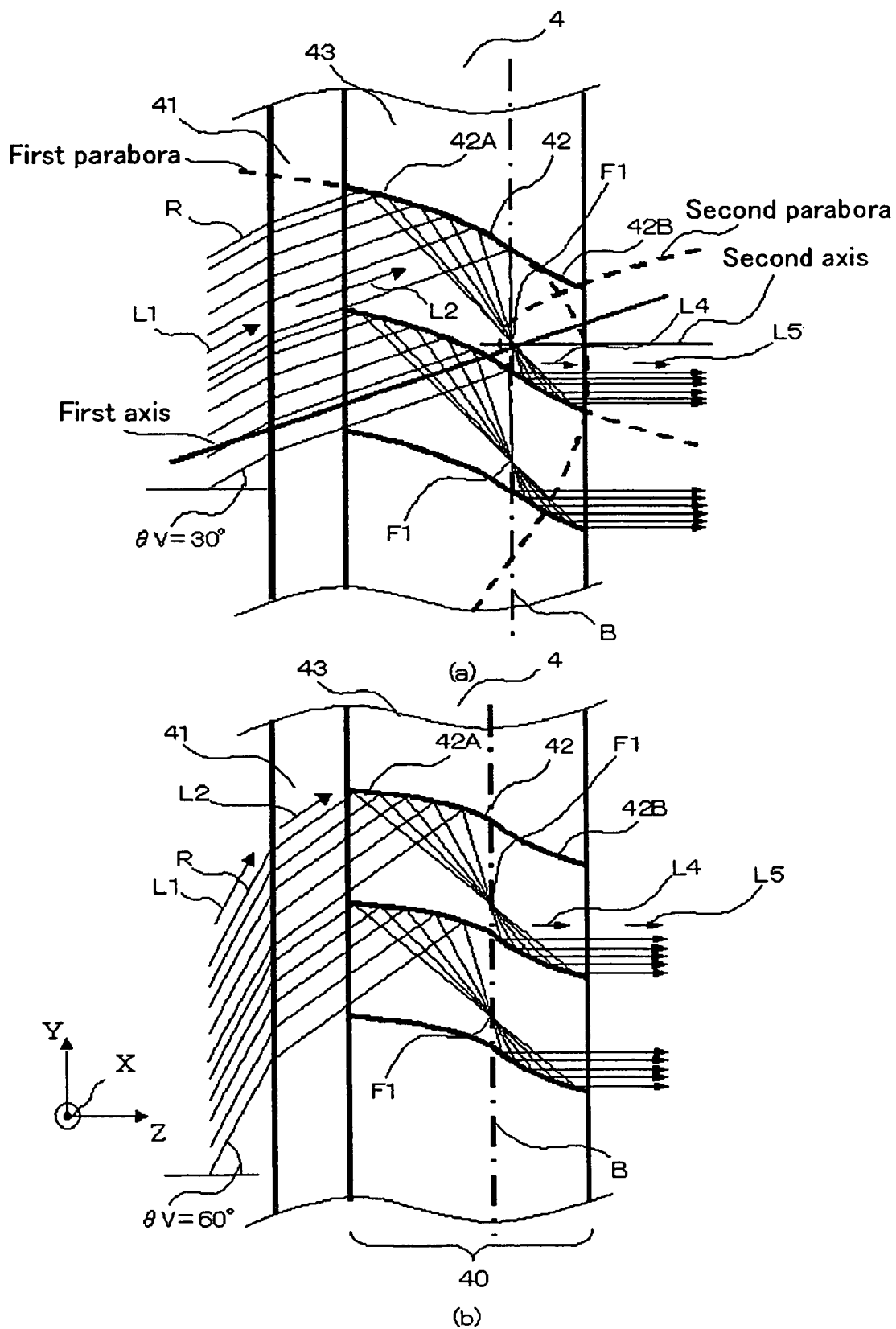
FIG. 4 is an explanatory view for explaining in detail the constitution of a light deflector in the rear-projection screen according to Embodiment 1 of the present invention.

FIG. 4 represents a magnified cross-section view in which the view in FIG. 3 is further magnified, and an explanatory view for explaining in detail the configuration of the light deflector 4. Symbols (a) and (b) in FIG. 4 represent cases in which the incident angles θV are different, that is, each of the cross-sectional shapes of the reflection means 42 provided at different positions on the light deflector 4 in the Y-axis of FIG. 3 is illustrated. Here, arrows R in the figure represent, by tracing light rays, light traveling paths in the light deflector 4.

FIG. 4(a) represents a magnified cross sectional view of the light deflector 4 at the position on which the incident light corresponding to an incident angle of θV=30 degrees is incident in the light deflector 4. The reflection means 42 is composed of a first reflection face 42A and a second reflection face 42B, and the reflection faces 42A and 42B become different reflection faces, being divided by an imaginary boundary B. Specifically explaining, the first reflection face 42A is provided in the left side of the imaginary boundary B (hereinafter referred to as a light incident side, or an incident face side), and its cross-sectional shape is a part of a first parabola with a first axis that is approximately in parallel with L2. Meanwhile, the second reflection face 42B is provided in the right side of the imaginary boundary B (hereinafter referred to as a light exiting side, or an exiting face side), and its cross-section shape is a part of a second parabola with a second axis that is approximately in parallel with the normal direction of the exiting face. Furthermore, both the focal point of the first parabola corresponding to the first reflection face 42A and the focal point of the second parabola corresponding to the second reflection face 42B lie at F1 in FIG. 4. Here, in the following explanation, symbol F1 is referred to as a focal point F1. In Embodiment 1, although an example is explained, in which the cross-sectional shape of the first reflection face 42A and the cross-sectional shape of the second reflection face 42B each are a part of a parabola, the cross-sectional shape of each of the reflection faces 42A and 42B needs only to be a part of any quadratic curve having a focal point; therefore an ellipse, hyperbola, etc., other than a parabola may be also adopted. Moreover, the quadratic curve corresponding to the first reflection face 42A and the secondary curve corresponding to the second reflection face 42B does not need to be the same secondary curve.

Here, because the focal point F1 is formed in such a way that the reflection means 42 lies along the concentric circles M1, the focal point F1 lies at a position on a focal line in parallel with the concentric circles M1. Moreover, the shape of the first reflection face 42A and the shape of the second reflection face 42B, which lie extendedly along the concentric circles M1, are a part of a paraboloid having the focal line.

In FIG. 4(a), the front of the incident face is in air, and the incident face of the light deflector 4 is made of acrylic material, etc., so that the refractive index differs between the front and back of the boundary face (incident face); therefore, the incident light on the light deflector 4 along L1, when it is incident on the light deflector 4, refracts according to Snell's law. Consequently, the traveling direction of the incident light, when it is incident on the light deflector 4, changes from L1 to L2.

The light having been refracted to the L2 direction is incident on the transparent material 43 in the light deflecting portion 40 through the transparent sheet 41. Here, as described above, the transparent sheet 41 is made of a resin film such as an acrylate or PET film, and the refractive index is approximately 1.5; therefore, the light refractivity at the boundary face between the transparent sheet 41 and the transparent material 43 can be decreased by the transparent material 43 being made of a transparent material such as UV-curable resin having a refractivity of approximately 1.5.

Thus, the light having exited from the transparent sheet 41 is incident on the transparent material 43 being refracted little. The light having passed through the transparent material 43 travels along L2 that is approximately in parallel with the first axis, and is reflected by the reflection face 42A in the reflection means 42. Because the light reached the first reflection face 42A is light from L2 that is approximately in parallel with the first axis, and the cross-sectional shape of the first reflection face 42A is the parabola whose axis is the first axis, the light reflected by the first reflection face 42A travels while focusing towards the focal point F1. Then, the light having passed through the focal point F1 is reflected by the second reflection face 42B of another means 42 that is placed adjacent to each other in the light deflecting portion 40, and exits from the exiting face to the direction that is approximately in parallel with L5.

On the other hand, FIG. 4(b) illustrates a magnified view of a cross section of the light deflector 4 at the position on which the incident light corresponding to an incident angle of θV=60 degrees is incident in the light deflector 4. The gradient, shape, and interval etc. of the reflection means 42 in the light deflector 4 are varied in accordance with the incident angle θV. Specifically explaining, in a case in which the first reflection face 42A in FIG. 4(b) is formed using the same parabola as the first parabola in FIG. 4(a), the shape of the first reflection face 42A becomes a part of a parabola in which the first parabola is rotated anti-clockwise centering the focal point F1 in such a way that the angle between the first axis corresponding to the first parabola and the Z-axis in the figure becomes 60 degrees. Here, the focal point of the first parabola and the focal point of the second parabola, independent from the value of the incident angle θV, are made to come to the same position.

In FIG. 4(b), incident light on the light deflector 4 along the L1 direction, whose incident angle with respect to the Z-axis is made at 60 degrees, which is approximately the same angle as the incident angle θV, is refracted on the incident face as with the case represented in FIG. 4(a), and travels in the transparent sheet 41 and the transparent material 43 along the L2 direction.

The light having traveled in the transparent material 43 reaches the second reflection face 42B of another adjacent reflection means 42, while it is being focused by the reflection by the first reflection face 42A in the reflection means 42. The light having reached the second reflection face 42B is reflected by the second reflection face 42B and then travels in the transparent material 43 along the L4 direction. Then, the light having traveled in the transparent material 43 along the L4 direction exits in the L5 direction that is approximately in parallel with the L4 direction, that is, approximately the same direction as the normal direction of the exiting face of the light deflector 4.

As explained above, the light that is incident at different incident angles θV on the light deflector 4, being deflected in the light deflecting portion 40 of the light deflector 4, exits from the exiting face in the direction approximately in parallel with the normal of the exiting face, and then is incident on the lenticular lens sheet 3. The lenticular lens sheet 3 using cylindrical lenses, etc. used in a conventional rear-projection screen expands the directivity of the exiting light in the right/left and top/bottom orientations over the entire screen, by changing the traveling direction of the incident light on the lenticular lens sheet 3 utilizing light refractivity, diffusion, etc.

In a Fresnel lens sheet, using a refractive prism, which is used in a conventional rear-projection screen, when the (incident) light having an incident angle of θV=60 degrees is incident, the transmittance in which the incident light is transmitted through the Fresnel lens sheet is approximately 70%. Moreover, in a Fresnel lens sheet using a fully reflecting prism, when incident light having an incident angle of θV=30 degrees is incident, the transmittance is approximately 55%. Therefore, in the above described conventional Fresnel lens sheet, when light is obliquely projected in such a way that the incident light having an incident angle of θV is incident, the light losses are increased or decreased in response to the change in the incident angle θV of the incident light. Therefore, it is difficult that the entire screen is displayed with uniform brightness.

However, according to the light deflector 4 in Embodiment 1, although reflection occurs on the incident face, because any refractive face does not exist in other portions thereof unnecessary refraction or reflection does not occur. Therefore, it is possible to make the transmittance approximately from 85% to 90% regardless of the incident angle θV. Therefore, image can be displayed with uniform brightness over the entire screen.

Here, the incident angle θV may be in the proximity of zero degree, or equal to or more than 60 degrees. That is, the incident angle θV may be arbitrarily determined within an appropriate range, according to the optical design of the light projection means 1, and cabinet constitution and the like of equipment such as a projection type TV, etc.

In the light deflector 4 according to Embodiment 1, although a part provided with the first reflection face 42A and a part provided with the second reflection face 42B, which compose the reflection means 42, are unified, that is, provided on a unified member, as far as the first parabola focal point and the second parabola focal point that correspond to the reflection faces 42A and 42B, respectively stay at the same position, both the reflection faces do not need to be provided on the unified member, and they can be separated astride the boundary B.

Moreover, the reflection means 42 may be formed using reflective materials such as a metal thin film made of aluminum, gold, silver, etc. Then, when a metal thin film is used for the reflection means 42, both the front and back faces of the metal thin film function as not only reflecting mirrors but also blinds for shielding the light so that light does not penetrate from the adjacent regions. Here, because the thickness of the metal thin film constituting the reflection means 42 may be made so that the reflectivity becomes sufficiently high (specifically, the thickness may be not less than 50 nm or not more than 1 μm), light losses at the edges of the light absorbing portion according to the conventional rear-projection screen are decreased. Moreover, by making the repeating intervals of the reflection means 42 shorter than a pixel size displayed, adjacent pixels are prevented from being mixedly displayed.

In the light deflector 4 according to the present invention, refractive faces do not substantially exist except for the incident face as described above. Therefore, any ghost light cannot occur, which is caused by reflected light generated on a refractive face, as in a conventional Fresnel lens sheet, and travels into the adjacent region.

As described above, according to the light deflector 4 in Embodiment 1, because the refractive faces do not substantially exist except for the incident face, light losses can be significantly reduced. Moreover, light penetrated from the adjacent regions can be shielded by the reflection means 42. Therefore, any ghost light cannot occur, which is caused by reflected light on a refractive face, as in a conventional Fresnel lens sheet, and travels into the adjacent region; and because the projected image is blur free, etc., the clear image can be displayed over the entire screen.

Figure 5:
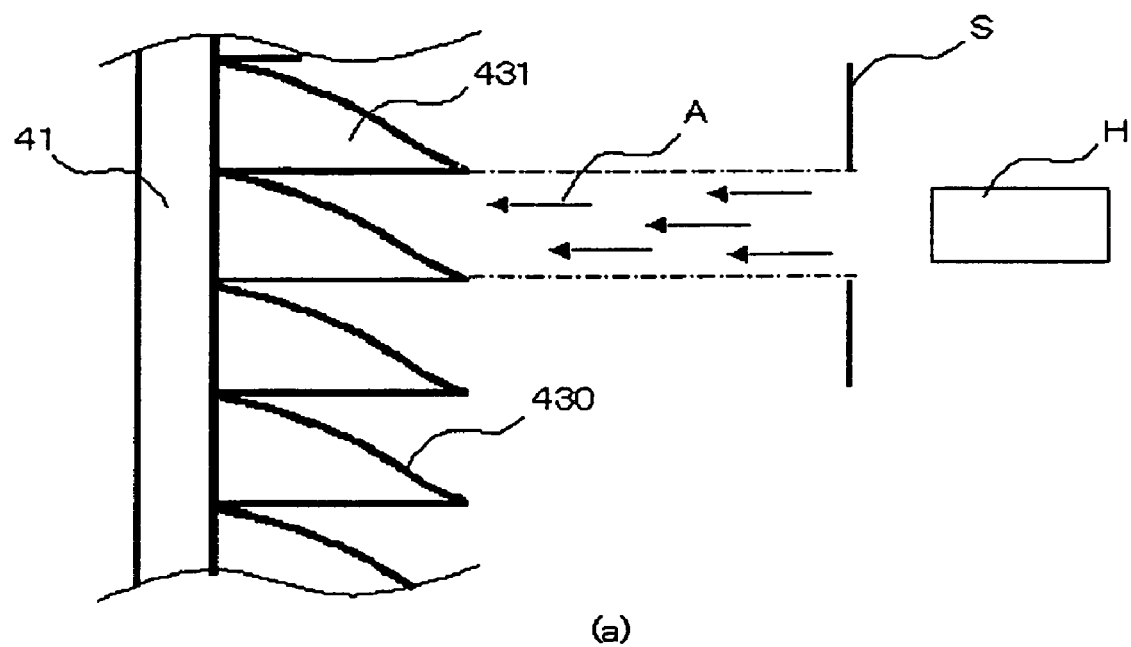
FIG. 5 is an explanatory view for explaining a manufacturing method for the light deflector in the rear-projection screen according to Embodiment 1 of the present invention.
Figure 5:
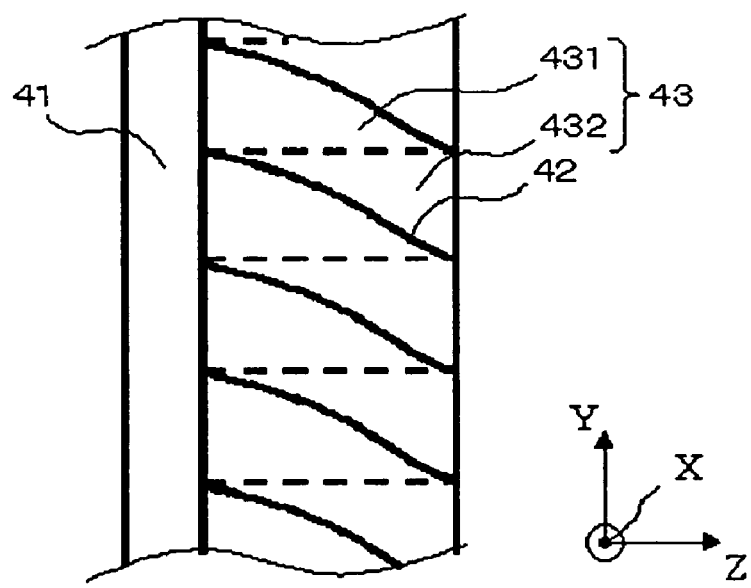

FIG. 5 is an explanatory view for explaining an example of manufacturing method for the light deflector 4 according to Embodiment 1. FIG. 5(a) and FIG. 5(b) are explanatory views for explaining a process of the manufacturing method for the light deflector 4. In the steps of manufacturing the light deflector 4, transparent sections 431 having a shape as represented in FIG. 5(a) are firstly formed on the transparent sheet 41 using a transfer die (not illustrated), etc.

Next, metal such as aluminum, gold, or silver (not illustrated) is heated by a heater H, and metal atoms A are selectively emitted through a slit S onto a face 430 on the transparent section 431; then, a metal thin film (reflection means) 42 having a thickness of equal to or more than 50 nm is formed on the face 430 of the transparent section 431. Here, the metal thin film can be formed by an evaporation method, a sputtering method, etc.

Then, as represented in FIG. 5(b), transparent material such as UV-curable resin is cast so as to fill the spaces between transparent sections 431 and metal thin films 42 formed on faces 430 of the transparent sections 431, and the transparent material is cured so that the exiting faces are formed approximately in parallel with the incident faces; thus, transparent sections 432 are formed. Moreover, by making the refractive index of the transparent section 431 approximately equal to the refractive index of the transparent section 432, and also maintaining the surface (interface) of the transparent section 431 clean during the manufacturing processes, unified transparent sections 43 including the reflection means 42 can be practically formed eliminating the effect of broken line in the figure. Moreover, in a case in which the reflection means 42 is formed by the metal thin film, reflectivity deterioration due to scratching or oxidation in the metal thin film can be prevented by the face of the reflection means 42 being covered with the transparent material 43.

Embodiment 2

Figure 6:
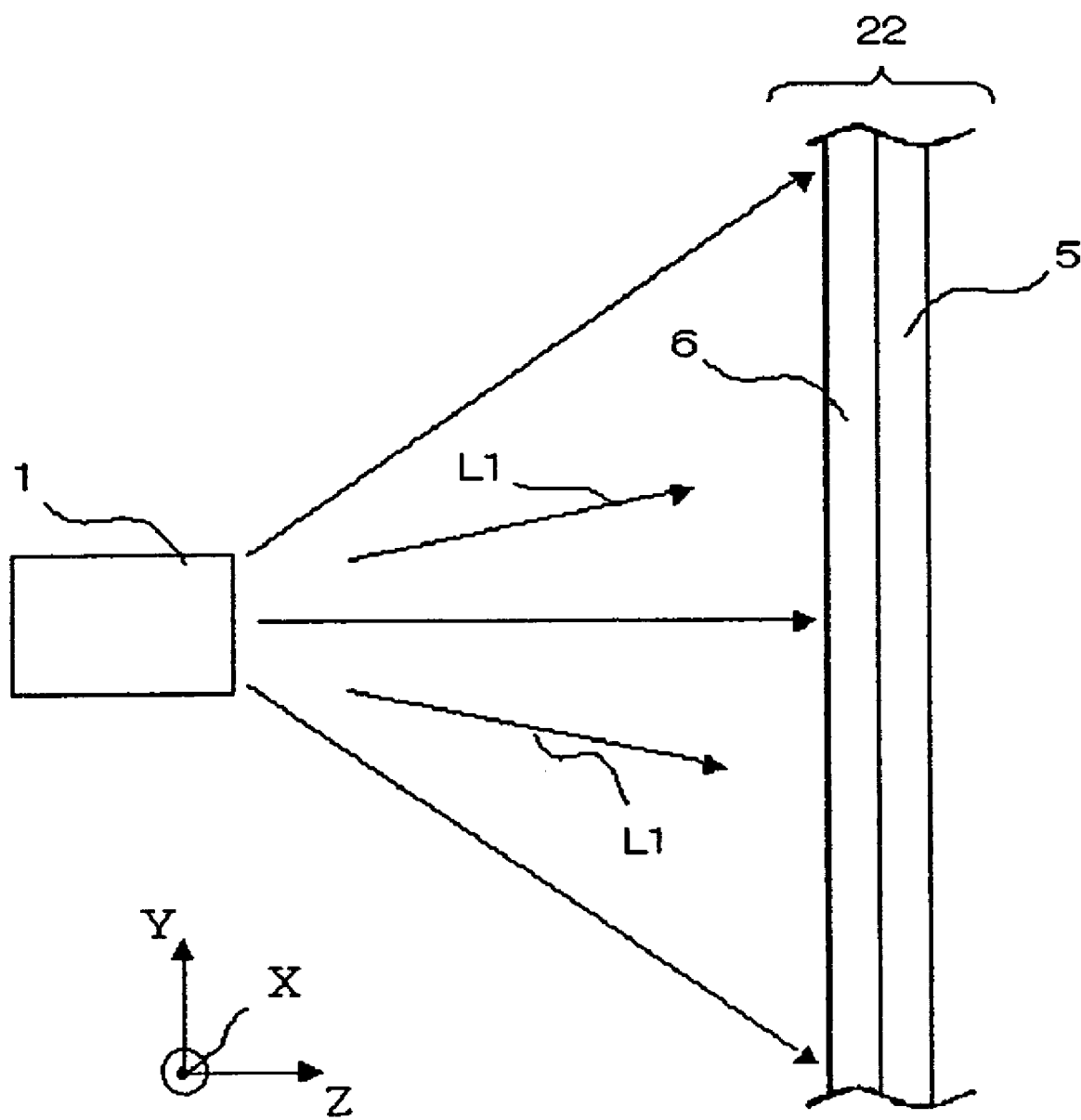
FIG. 6 is a side view illustrating a rear-projection screen according to Embodiment 2 of the present invention.

FIG. 6 is a side view illustrating a rear-projection screen according to Embodiment 2. In FIG. 6, light projected from the light projection means 1 travels spreadingly along the light traveling direction (L1 in FIG. 6) towards a rear-projection screen 22. Here, in this embodiment, the same numerals are given to elements that are included in the same configurations as those explained in Embodiment 1, and their explanations will be omitted.

The rear-projection screen 22 according to Embodiment 2 is configured in such a way that a first lens sheet 5 and a second lens sheet 6 are adjacently arranged and supported by a screen supporting frame (not illustrated), etc.

The light projected from the light projection means 1 is at first incident on the second lens sheet 6. The rear-projection screen 22 gives uniform directivity over the entire screen in response to the light projected from the light projection means 1 onto the rear-projection screen 22, and emits light as exiting light.

Figure 7:
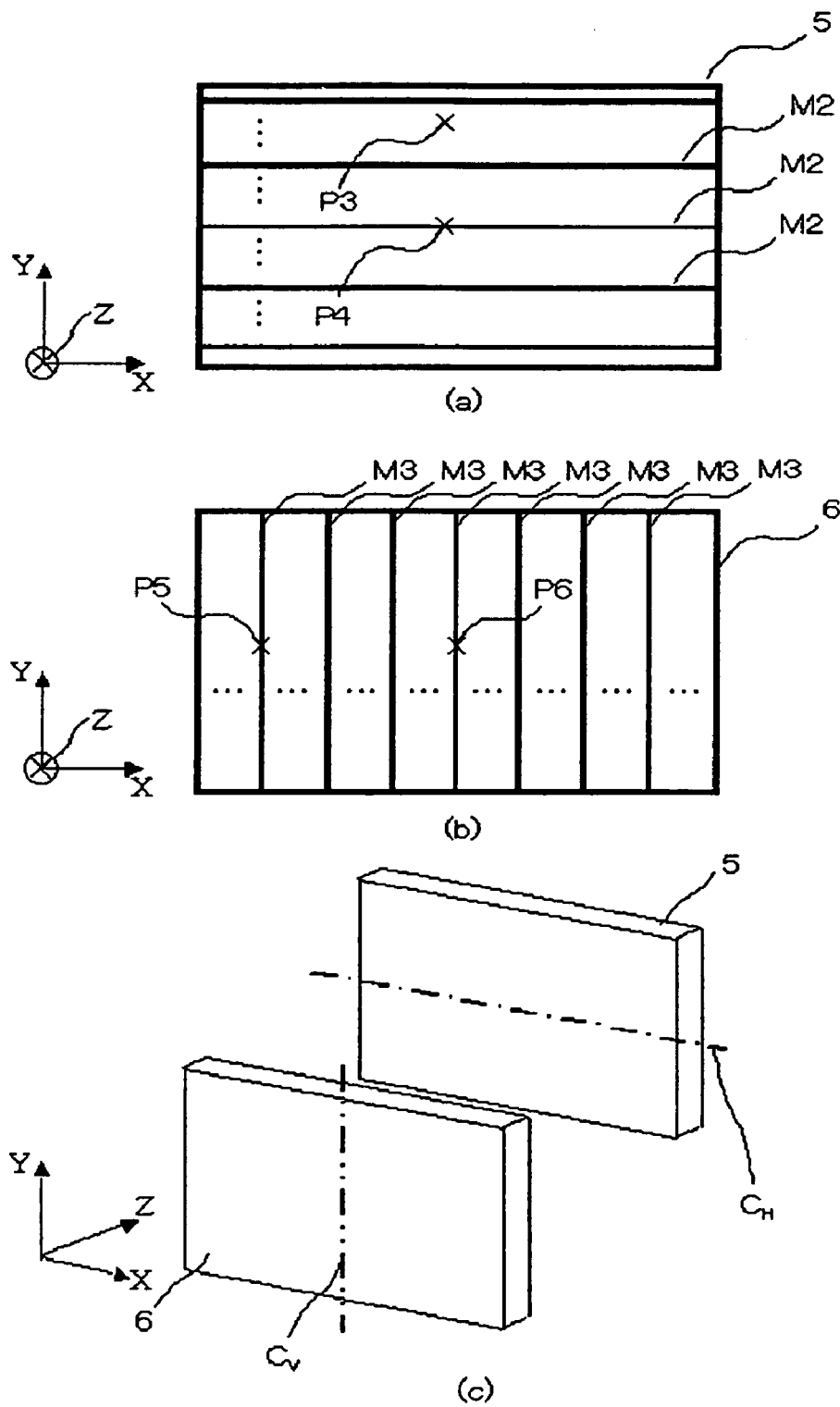
FIG. 7 is an explanatory view for explaining a first lens sheet and a second lens sheet that compose the rear-projection screen according to Embodiment 2 of the present invention.

FIG. 7 is an explanatory view for explaining the first lens sheet 5 and the second lens sheet 6 that compose the rear-projection screen 22. FIG. 7(a) is an explanation view for explaining a case in which the first lens sheet 5 is viewed from the Z-axis, that is, from the viewer side; FIG. 7(b) is an explanation view for explaining a case in which the second lens sheet 6 is viewed from the viewer side; and FIG. 7(c) is an explanation view for explaining the center line of the horizontal orientation (X-axis) in the first lens sheet 5, and the center line of the vertical orientation (Y-axis) in the second lens sheet 6.

In the first lens sheet 5 illustrated in FIG. 7(a), a plurality of lines M2 in parallel with the X-axis represents the longitudinal orientation (extending orientation) of a cylindrical reflection means (reflection means 52 described later) that is provided on the first lens sheet 5. Similarly, in FIG. 7(b), a plurality of lines M3 in parallel with the Y-axis represents the longitudinal orientation (extending orientation) of a cylindrical reflection means (reflection means 62 described later) that is provided on the second lens sheet 6. Here, both intervals between M2 lines and between M3 lines may be made shorter than a pixel size on the screen, similarly to those in the light deflector 4 in Embodiment 1.

Figure 8:
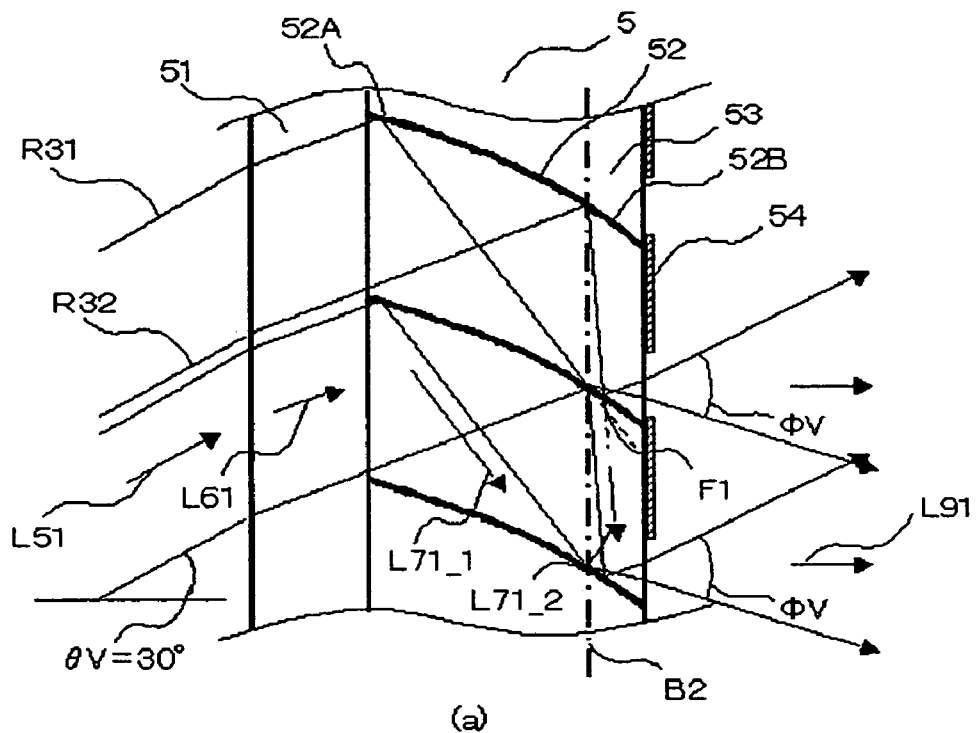
FIG. 8 is a magnified cross-sectional view illustratively magnifying a part of a cross-section of the first lens sheet that composes the rear-projection screen according to Embodiment 2 of the present invention.
Figure 8:
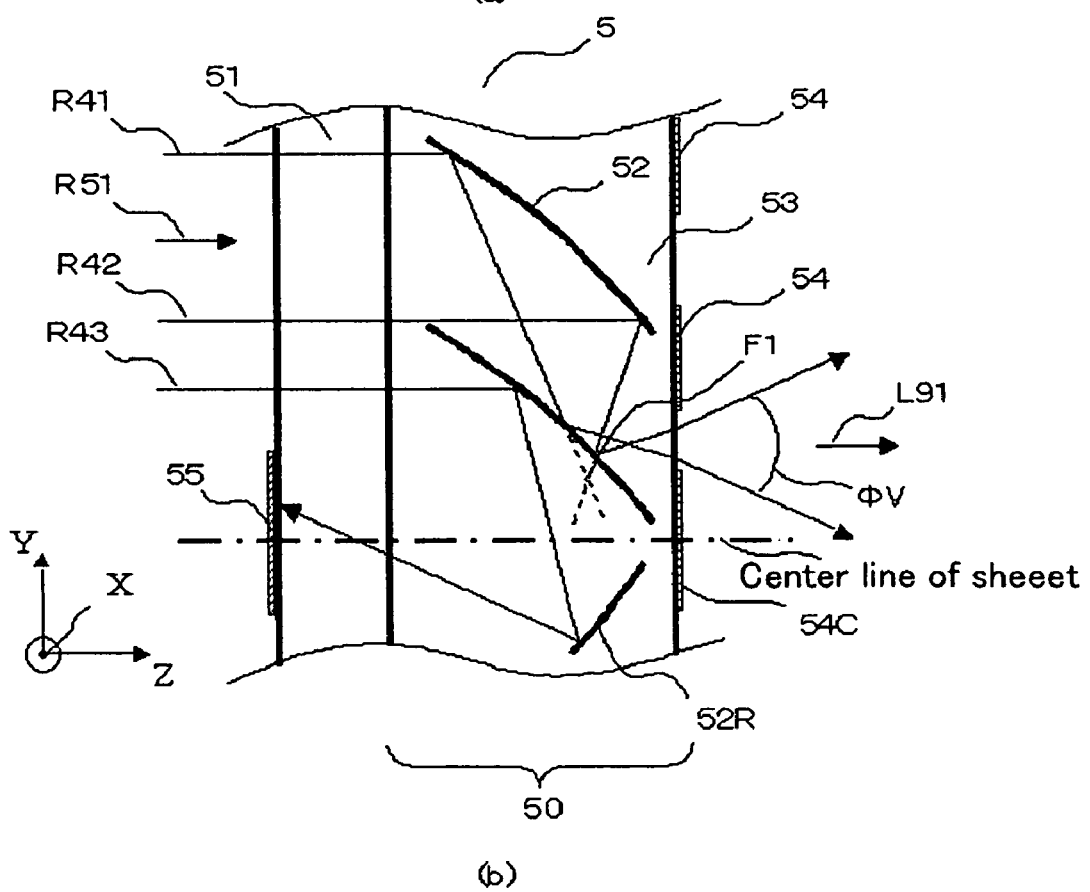

FIG. 8 is a magnified cross-sectional view illustratively magnifying a case in which cross sections in parallel with the Y-axis at a position P3 and a position P4 on the first lens sheet 5 illustrated in FIG. 7(a) each are viewed from the X-axis direction. FIG. 8(a) illustrates the cross section in parallel with the Y-axis at the position P3, while FIG. 8(b) illustrates the cross section in parallel with the Y-axis at the position P4. Moreover, in FIG. 8, the incident light is incident from the direction opposite to the Z-axis, that is, from the left side, and exits towards the Z-axis direction (the right side).

At the position P3, as illustrated in FIG. 8(a), the incident light is incident on the first lens sheet 5, at an angle of 30 degrees with respect to the Z-axis. Here, FIG. 8(a) represents a case in which a shape of the reflection means 52 in the first lens sheet 5 is set, according to light beam tracing, so that a spreading angle ΦV of the exiting light emitted from the first lens sheet 5 becomes approximately 40 degrees.

In the first lens sheet 5, light-emitted from the second lens sheet 6 that is adjacently arranged is incident, as incident light, along L51. Here, the incident light is the projected light, from the projection means 1, that diffuses only in the horizontal orientation (along the X-axis) in the second lens sheet 6, and does not diffuse in the vertical orientation (along the Y-axis).

The incident light is refracted when being incident on a transparent sheet 51, and travels along L61 in the transparent sheet 51. Similarly, as explained in Embodiment 1, the light traveling along L61, by the refractivities of the transparent sheet 51 and transparent material 53 being made approximately the same, travels in the transparent material 53 without being refracted at their boundary, and is reflected by a first reflection face 52A in the reflection means 52. The light having been reflected by the first reflection face 52A travels along L71, being focused at the focal point F1, and reaches a second reflection face 52B on another adjacent reflection means 52. The light having been reached the second reflection face 52B is reflected by the second reflection face 52B, and exits from a slit between black stripes 54. Here, because the light traveling directions L71 reflected by the first reflection face 52A vary due to at what position on the first reflection face 52A the light has been reflected, a plurality of L71s is practically existent; however, in FIG. 8(a), as the examples, symbols L71_1 and L71_2 are represented. Moreover, the black stripes 54 are light absorber.

The reflection means 52 is composed of the first reflection face 52A and the second reflection face 52B, and the reflection faces 52A and 52B become different reflection faces separated by the imaginary boundary line B. Specifically explaining, the first reflection face 52A is provided on the incident face side, and its cross-sectional shape is a part of a parabolic curve whose axis corresponds to an axis approximately in parallel with L51. On the other hand, the second reflection face 52B, provided on the exiting face side, is shaped into a curved face or a planer face in such a way that the vertical directivity can be obtained, which is needed for light traveling in parallel with L91 that is a direction approximately in parallel with the main axis of exiting light. Here, the shape of the second reflection face 52B may be a planer mirror or a parabolic face mirror in a case in which the directivity for the exiting light is sufficient enough. Moreover, in a case in which wider exiting light directivity is needed, when the light reflected by the first reflection face 52A is focused, the light traveling along L71 may be reflected using the second reflection face 52B shaped into a concave mirror, meanwhile, when the light reflected by the first reflection face 52A is spreading, the light traveling along L71 may be reflected using the second reflection face 52B shaped into a convex mirror.

On the other hand, at the position P4, as illustrated in FIG. 8(*b*), the light is incident on the first lens sheet 5 approximately in parallel with the Z-axis, that is, in the proximity of the incident angle θV=0 degree. Here, FIG. 8(*b*) represents a case in which a shape of the reflection means 52 in the first lens sheet 5 is set according to light beam tracing so that the spreading angle ΦV of the light exiting from the first lens sheet 5 becomes approximately 40 degrees, as in FIG. 8(*a*). Moreover, in the case represented in FIG. 8(*b*), even if the entire cross-sectional of the reflection means 52 is shaped into a parabolic face, the directivity needed for the exiting light can be obtained.

At the center (the position corresponding to $C_H$ in FIG. 7(*c*)) of the first lens sheet 5, the reflection means 52 and a reflection means 52R are provided so as to be symmetrical each other with respect to the center line of the sheet illustrated in FIG. 8(*b*). Here, the lower side from the reflection means 52R (opposite to the Y-axis direction) corresponds to the lower side of the first lens sheet 5. In the first lens sheet 5, on a place in which the reflection means 52 and the reflection means 52R are adjacent to each other, that is, on the center of the first lens sheet 5, a portion of the light, for example, the light being incident along R43 does not exit from the exiting face, but is reflected towards the incident face side.

The light reflected by the reflection means 52 and 52R provided on the center of the first lens sheet as described above is absorbed by black stripes 54C and 55, so as not to be interfering light that can cause stray light or ghost light. Here, by the intervals between each of the adjacent reflection means 52 in the first lens sheet 5 being made to be an integral fraction of the pixel size on the screen, image quality deterioration due to the exiting light not exiting from the center of the first lens sheet 5 can be prevented. Although an example is explained in a case in which the light being incident on the first lens sheet 5 has an angle θV of 0 degree or 30 degrees with respect to the Z-axis, the incident angle θV may be from 0 degree to 30 degrees, or may be at an angle wider than that angle; that is, by the reflection means 52 being suitably shaped, exiting light whose optical axis is perpendicular to the exiting face and whose directivity has a full field angle of 40 degrees can be made to exit.

Figure 9:
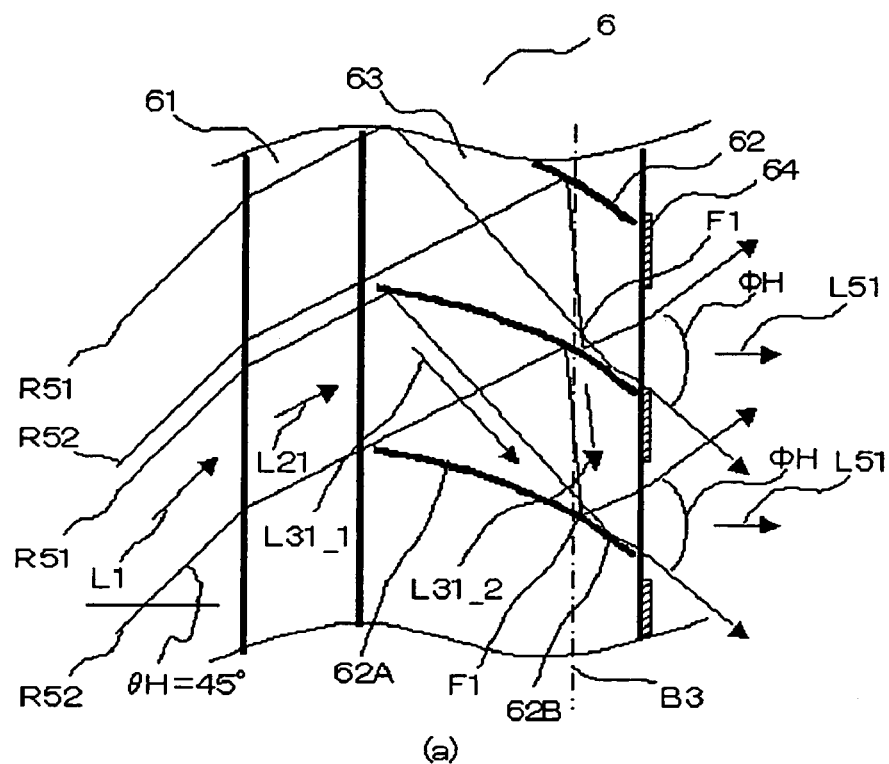
FIG. 9 is a magnified cross-sectional view magnifying and illustrating a cross-section of a part of the second lens sheet that composes the rear-projection screen according to Embodiment 2 of the present invention.
Figure 9:
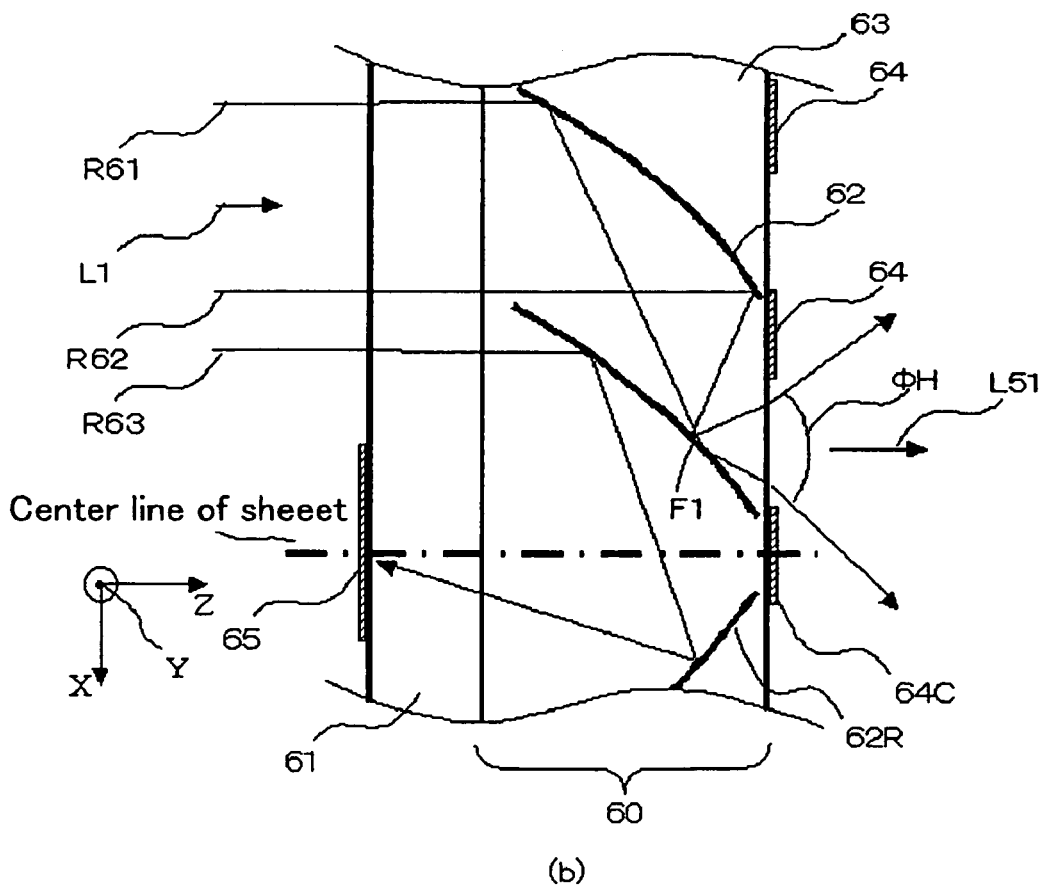

FIG. 9 illustrates magnified cross-sectional views in which cross-sections in parallel with the X-axis at the position P5 and the position P6 on the second lens sheet 6 illustrated in FIG. 7(*b*) each are viewed from the Y-axis direction; and FIG. 9(*a*) illustrates the cross-section at the position P5, meanwhile FIG. 9(*b*) illustrates the cross-section at the position P6. In addition, in FIG. 9, the light is also incident on the incident face of the second lens sheet 6 from the opposite direction to the Z-axis (the left side), and exits from the exiting face of the second lens sheet 6 towards the Z-axis direction (the right side).

At the position P5, as represented in FIG. 9(*a*), the light having an incident angle θH of 45 degrees with respect to the Z-axis is incident on the second lens sheet 6. Here, FIG. 9(*a*) illustrates a case in which the reflection means 62 in the second lens sheet 6 is shaped, according to light beam tracing, so that a spreading angle ΦH of the exiting light emitted from the second lens sheet 6 becomes a full field angle of approximately 80 degrees.

The incident light refracts when being incident on a transparent sheet 61, and travels towards L21 in the transparent sheet 61. The light having traveled along L21, by the refractive index of the transparent sheet 61 and the refractive index of transparent material 63 being made approximately the same, travels towards approximately the same direction as L21 in the transparent material 63 without refracting at the boundary therebetween, and then is reflected by a first reflection face 62A of the reflection means 62. The light having been reflected by the first reflection face 62A travels, being focused at the focal point F1, and then reaches a second reflection face 62B of another adjacent reflection means 62. The light having reached the second reflection face 62B is reflected by the second reflection face 62B, and then exits from a slit between black stripes 64. Here, because traveling direction L31 of the light reflected by the first reflection face 62A differs depending on at what position on the first reflection face 62A the light has been reflected, symbols L31_1 and L31_2, as the example, are represented in FIG. 9(*a*).

The reflection means 62 is composed of the first reflection face 62A and the second reflection face 62B, similarly to the reflection means 52 of the first lens sheet 5, and the reflection faces 62A and 62B become differently shaped reflection faces separated by an imaginary boundary line B3. That is, the first reflection face 62A is provided on the incident face side, and the cross-sectional shape is a part of a parabolic curve whose axis corresponds to an axis approximately in parallel with L21. Meanwhile, the second reflection face 62B is provided on the exiting face side, and shaped into a curved face or a planer face so that the face has characteristics in which the horizontal directivity needed for the light traveling in parallel with L51, which is a direction approximately parallel with the main axis of the exiting light, is obtained. Here, the shape of the second reflection face 62B may be a planer mirror or a parabolic face when the directivity of the exiting light is sufficient enough. Moreover, in a case in which the directivity of the exiting light need to further be made wide, when the light reflected by the first reflection face 62A is focused, the light traveling along L31 may be reflected by the second reflection face 62B being a concave mirror; meanwhile, when the light reflected by the first reflection face 62A is spreading, the light traveling along L31 may be reflected by the second reflection face 62B being a convex mirror.

On the other hand, at the position P6, the incident light is incident on the second lens sheet 6 approximately in parallel with the Z-axis, that is, at an incident angle θH of approximately 0 degree as represented in FIG. 9(*b*). Here, FIG. 9(*b*), similarly to FIG. 9(*a*), illustrates a case in which the reflection means 62 in the second lens sheet 6 is shaped, according to light beam tracing, so that a spreading angle ΦH of the exiting light emitted from the second lens sheet 6 is made to be approximately 80 degrees. Moreover, in the case illustrated in FIG. 9(*b*), similarly to FIG. 8(*b*), even if the entire cross-section of the reflection means 62 is shaped into a parabolic face, the directivity needed for the exiting light can also be obtained.

At the center (the position corresponding to $C_V$ in FIG. 7(*c*)) of the second lens sheet 6, similarly to the first lens sheet 5, the reflection means 62 and the reflection means 62R are provided so as to have a symmetrical cross-sectional shape each other with respect to the sheet center line represented in FIG. 9(b); consequently, in the second lens sheet 6, at a position in which the reflection means 62 and the reflection means 62R are adjacent to each other, that is, at the center of the second lens sheet 6, a portion of the incident light, such as the light being incident along R63 is not emitted from the exiting face, but reflected to the incident face side. Here, in the second lens sheet 6, the reflection means 62 is provided on the left side, viewed from a viewer, of the second lens sheet 6, while the reflection means 62R is provided on the right side. That is, the second lens sheet 6 is symmetrical, in the left/right orientation, with respect to the center of the sheet.

As described above, the light reflected by the reflection means 62 and 62R at the center of the second lens sheet 6 is absorbed by black stripes 64C and 65 so as not to be interfering light that can cause stray light or ghost light. Here, similarly to the first lens sheet 5, by the intervals of the reflection means 62 provided in parallel with each other in the second lens sheet 6 being made to be an integral fraction of the pixel size on the screen, image quality deterioration due to the exiting light not exiting from the center of the second lens sheet 6 can be prevented. Although an example is explained in a case in which the light being incident on the second lens sheet 6 has angles θV of 0 degree and 45 degrees with respect to the Z-axis, the incident angle θV may be from 0 degree to 45 degrees, or may be further wide angle; that is, by the reflection means 62 being suitably shaped, exiting light that has an optical axis perpendicular to the exiting face and the directivity having a full field angle of 80 degrees can be emitted.

As explained above, in the rear-projection screen 22 according to Embodiment 2, by passing the projection light that is projected from the projection means 1 and travels spreadingly in up/down and right/left orientations, through the second lens sheet 6 at first, the horizontal directivity of a full field angle of 80 degrees is given to the horizontal direction (the X-axis direction) over the entire screen. Then, by subsequently passing the exiting light emitted from the second lens sheet 6 through the first lens sheet 5, the vertical directivity of a full field angle of 40 degrees is given to the perpendicular direction (the Y-axis direction) for the entire screen. Therefore, exiting light with uniform brightness over the entire screen is finally emitted from the rear-projection screen 22.

Therefore, according to the rear-projection screen 22 in Embodiment 2, because the rear-projection screen 22 is composed of the lens sheets 5 and 6 using the reflection means 52 and 62, respectively, without using any refraction prism, the optical-axis tilting in the screen perimeter portion, due to reflection by a linear Fresnel lens as in a conventional rear-projection screen, does not occur. Consequently, images projected from the light projection means 1 can be displayed clearly over the entire screen with excellent image quality.

Here, the horizontal and vertical directivities given to light by each of the lens sheets 5 and 6 are not limited to the above described angles but can be arbitrarily determined according to system specifications. In addition, the directivity may be suitably controlled, using a method in which any of dispersants (ceramic powder, resin powder, etc.) are mixed and applied to the transparent materials 52 and 63, in accordance with the directivity needed for a system in which the rear-projection screen 22 is installed.

Moreover, by the black stripes 54 and 64 being provided, it can be prevented that light reflected on each exiting face of the first lens sheet 5 and the second lens sheet 6 reflects multiple times, and it can be also prevented that any external light is incident on the interior of the lens sheets 5 and 6. Therefore, projected images are clear over the entire screen, and high-contrast images can be also obtained even in a bright room.

Moreover, the first lens sheet 5 and the second lens sheet 6 that compose the rear-projection screen 22 according to Embodiment 2 substantially have no refracting face except for the incident face and the exiting face. Therefore, any coloring phenomenon due to wave-length-dependent-refractivity dispersion and ghost light occurrence due to the reflection on the boundary face can be prevented, which have been problems in the conventional rear-projection screen using a lenticular lens sheet having cylindrical lenses. In addition, clear images can be displayed without being colored and smeared.

Furthermore, the rear-projection screen may be composed of the first lens sheet 5 and the second lens sheet 6 by adhesion using an adhesive agent (not illustrated); in such a case, because the boundary face becomes thin, optical losses can be reduced by approximately 8%.

A reflection preventing means may be provided on both or either of the incident face of the second sheet 6 or the exiting face of the first lens sheet 5. For example, single or double layered optical thin films that are designed based on the optical-thin-film design method may be provided; in this case, the reflection losses on the incident face or the reflection face can be made equal to or less than 50%. In addition, anti-reflection coating may be applied.

The first lens sheet 5 or the second lens sheet 6 may be adhered to another transparent planer material (not illustrated) using an adhesive agent, etc. (not illustrated). For example, by a transparent protecting board being provided on the viewer-side face of the rear-projection screen 22, the protecting board being adhered to the first lens sheet 5, and then the first lens sheet 5 further being adhered to the second lens sheet 6, not only high-planarity of the rear-projection screen 22 can be assured over the entire screen, but also breakage of the lens sheets 5 and 6 can be prevented.

Moreover, the first lens sheet 5 and the second lens sheet 6 can be produced by a continuous extrusion-producing method, etc. using dies (not illustrated) corresponding to each cross-sectional shape of the lens sheets 5 and 6. A continuous producing method including also aluminum evaporation processing is disclosed, for example, in Patent Document 4 (FIG. 6, on page 6); through such continuous production, production efficiency and yield can be raised, resultantly a low-cost lens sheet can be obtained.

Embodiment 3

Figure 10:
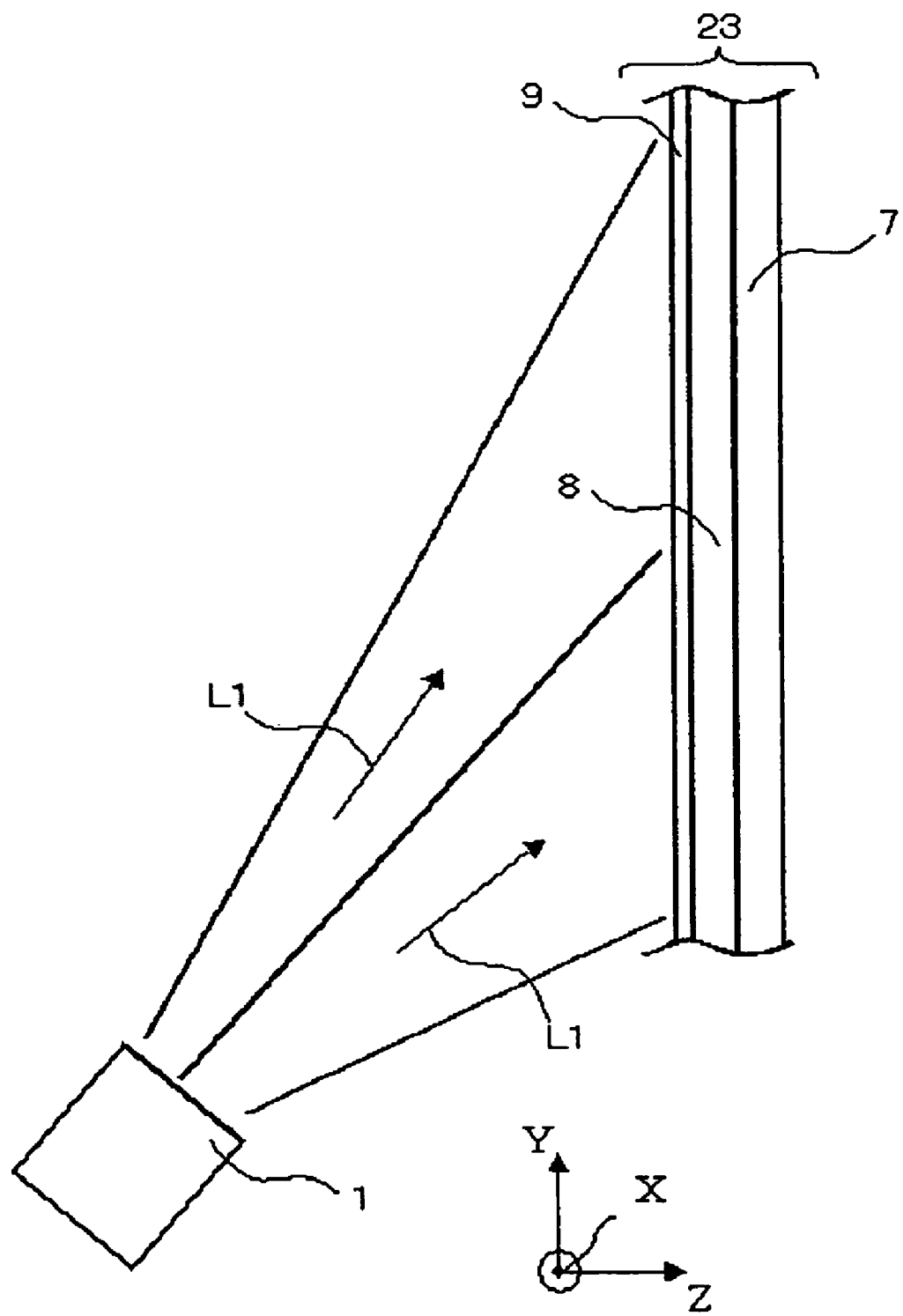
FIG. 10 is a side view illustrating a rear-projection screen according to Embodiment 3 of the present invention.

FIG. 10 is a side view illustrating a rear-projection screen 23 in Embodiment 3 viewed from the X-axis direction. In this figure, light projected from the light projection means 1 spreadingly travels along the light traveling direction L1 towards the rear-projection screen 23. Then, images projected by the light projection means 1, by the projected light reaching the rear-projection screen 23, are magnified and projected onto the rear-projection screen 23. The rear-projection screen 23 is composed of a first lens sheet 7, a second lens sheet 8, and a Fresnel lens sheet 9, so as to be unified and held adjacent to each other. Here, the Fresnel lens sheet 9 is a lens sheet having no (nil-) focusing function, and provided on the incident face of the rear-projection screen 23.

Figure 11:
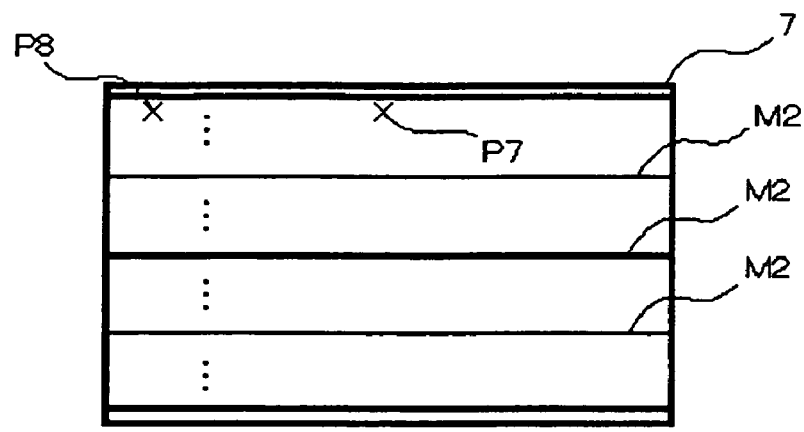
FIG. 11 is an explanatory view for explaining a case in which a first lens sheet, a second lens sheet, and a Fresnel lens sheet that compose the rear-projection screen according to Embodiment 3 of the present invention are viewed from the viewer side.
Figure 11:
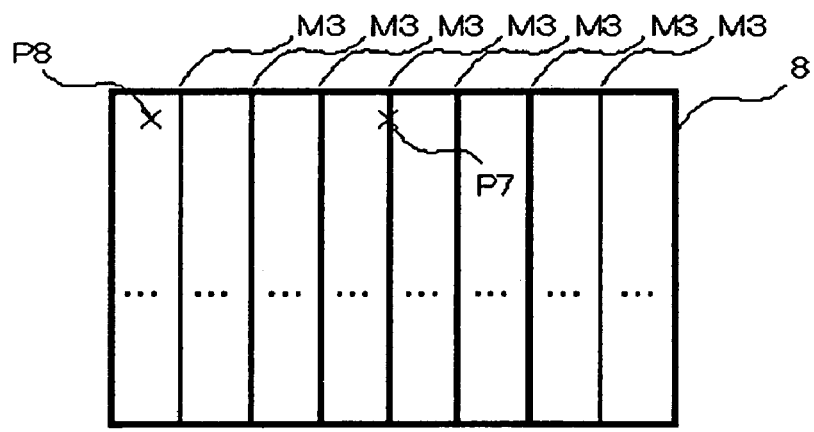
Figure 11:
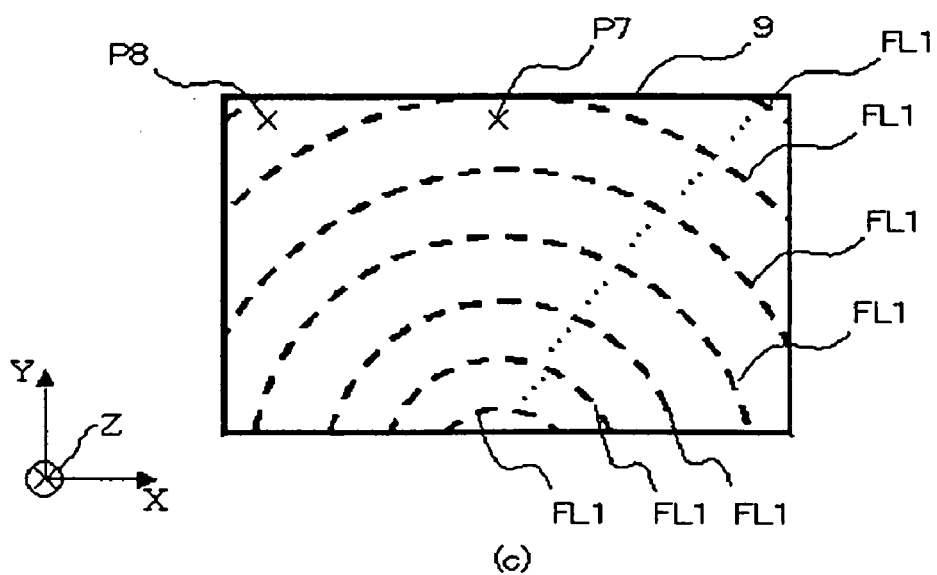

FIG. 11 is an explanatory view for explaining three lens sheets that compose the rear-projection screen 23. FIG. 11(a) is a front view when the first lens sheet 7 is viewed from the viewer side; while, in the first lens sheet 7, reflection means (reflection means 73 described later) extend along the X-axis, that is, along M2, and are arranged side-by-side in the Y-axis direction. FIG. 11(b) is a front view when the second lens sheet 8 is viewed from the viewer side; while, in the second lens sheet 8, reflection means (reflection means 83 described later) extend along the Y-axis, that is, along M3, and are arranged side-by-side in the X-axis direction. Moreover, FIG. 11(c) is a front view when the Fresnel lens sheet 9 is viewed from the viewer side; while, in the Fresnel lens sheet 9, Fresnel lens patterns extend along concentric circles FL1.

Here, similarly to the light deflector 4 and the lens sheets 5 and 6 explained in Embodiment 1 or 2, each interval of the M2, M3, and FL1 lines may be made smaller than a pixel size of an image displayed on the rear-projection screen 23, for example, made to be 50 µm-500 µm. The ratio between the positional interval of each reflection means in the lens sheets 7 and 8 and the positional interval of the Fresnel lens patterns is made not to be integral multiple in order to prevent moiré patterns.

Figure 12:
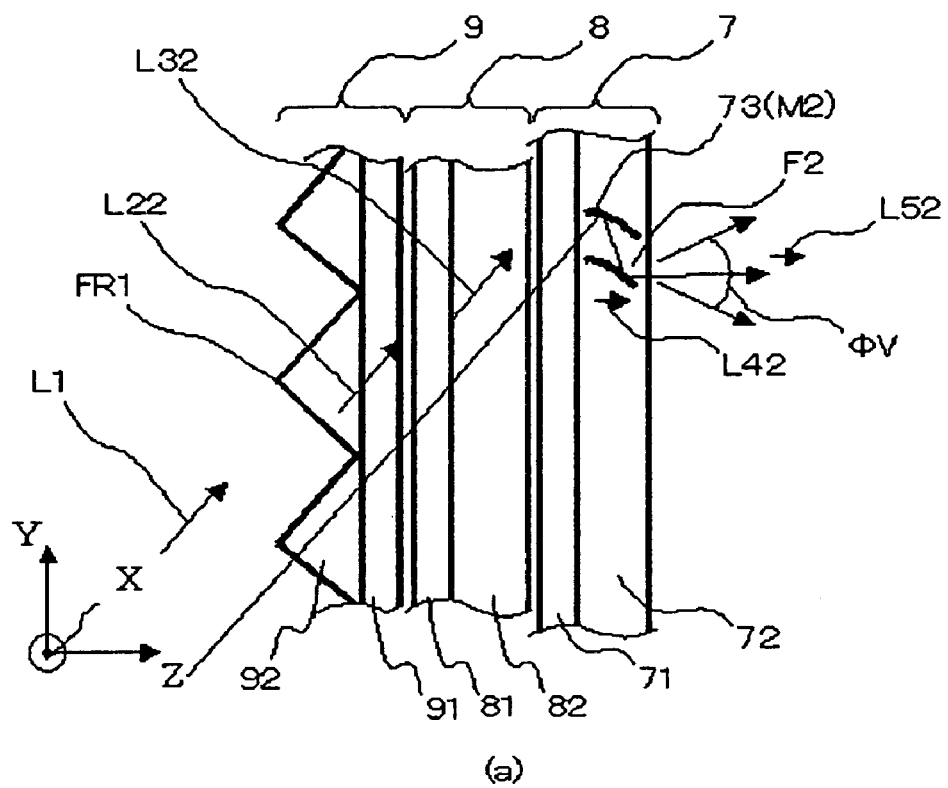
FIG. 12 is a magnified cross-sectional view illustratively magnifying a cross-section of a part of the rear-projection screen according to Embodiment 3 of the present invention.
Figure 12:
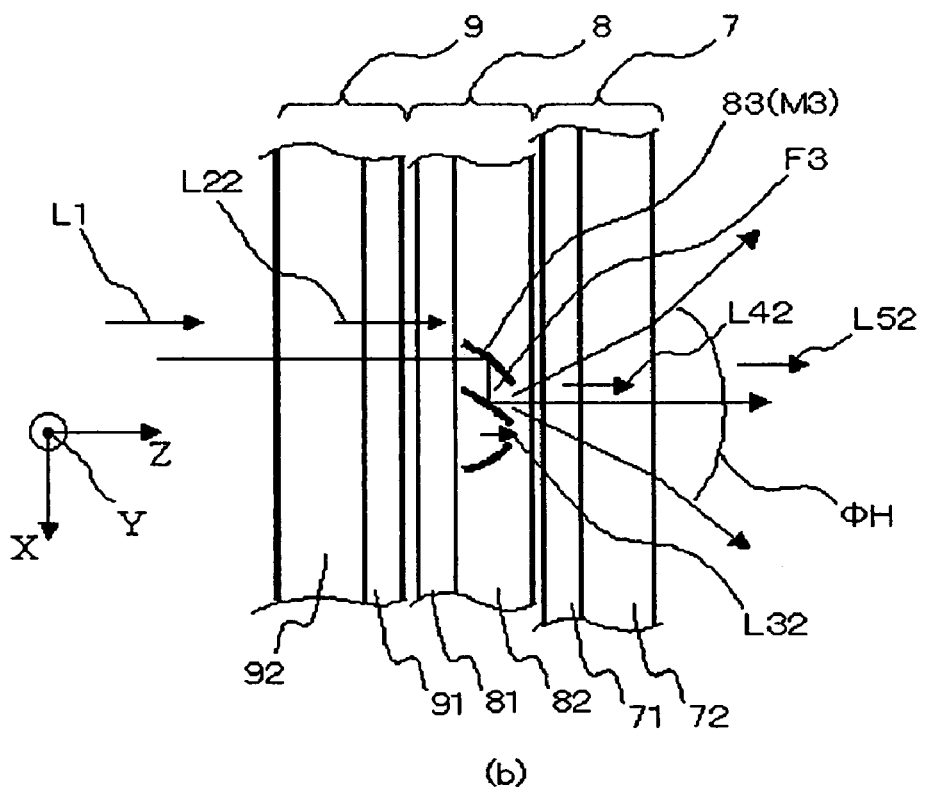

FIG. 12 is magnified cross-sectional views in which a cross-section, at a position P7 in FIG. 11, of the rear-projection screen 23 is illustratively magnified, meanwhile, FIG. 12(a) is a magnified view in which the cross-section, at the position P7, along the Y-axis direction is illustratively magnified when the cross-section is viewed from the X-axis direction, and FIG. 12(b) is a magnified view in which the cross-section, at the position P7, along the X-axis direction is illustratively magnified when the cross-section is viewed from the Y-axis direction. Here, practically, a plurality of reflection means 73 in a vertical-diffuser 72 for diffusing light having been incident on the first lens sheet 7 in the Y-axis direction in the figure, and a plurality of reflection means 83 in a horizontal-diffuser 82 for diffusing light having been incident on the second lens sheet 8 in the X-axis direction in the figure are arranged side-by-side in the Y-axis direction and the X-axis direction, respectively; however, only the main components used in the following explanation are illustrated in FIG. 12. Moreover, the reflection means 73 and the reflection means 83, corresponding to the incident angles, ΦV and ΦH, may be constituted similarly to the reflection means provided on the first lens sheet 5 and second lens sheet 6 in Embodiment 2.

In FIG. 12(a), light projected from the light projection means 1 travels along L1 in the figure, and is incident on a Fresnel lens portion 92 (Fresnel lens patterns) in the Fresnel lens sheet 9. Incident faces of the Fresnel lens portion 92 are configured so as to be approximately orthogonal to the incident-light traveling direction L1. Therefore, the incident light, in which the traveling direction does not vary according to the refraction, etc., travels along L22, which is approximately the same direction as L1. Moreover, the incident light straightly travels along L22, passes through a transparent sheet 91, and is incident on the second lens sheet 8.

The light having been incident on the second lens sheet 8 also travels along L32, which is approximately the same direction as L22 in the second lens sheet 8, and exits from the second lens sheet 8 after having passed through the transparent sheet 81 and the horizontal-diffuser 82 that compose the second lens sheet 8.

The light having exited from the second lens sheet 8 is incident as incident light on the first lens sheet 7, then passes through the transparent sheet 71, and is incident on the vertical-diffuser 72. Then, the incident light is reflected by a first reflection face in a reflection means 73 provided on the vertical-diffuser 72, reflected, with the light being focused at a focal point F2, by a second reflection face in another reflection means 73 that is provided adjacent to means 73, exits, along L52 that is approximately the same direction as a normal direction of the exiting face of the first lens sheet 7, from the exiting face, with the directivity being spread at half angle ΦV, and travels towards a viewer. Here, ΦV is set at approximately from 20 degrees to 40 degrees. Moreover, the shape of the reflection means 73 and the forming method are similar to the case of the reflection means 52 in Embodiment 2 except for the incident angle of the light; therefore, the explanation is omitted.

On the other hand, in FIG. 12(b), light projected from the light projection means 1 travels along L1 in the figure, similarly to the case in FIG. 12(a), and is incident on the Fresnel lens portion 92. The light having passed through the Fresnel lens sheet 9 is reflected by a first reflection face of the reflection means 83 provided on the horizontal-diffuser 82 of the second lens sheet 8, reflected, with the light being focused at a focal point F3, by a second reflection face in another reflection means 73 that is provided adjacent means 73, and travels along L32 in the horizontal-diffuser 82.

Thus, the light having traveled along L32 exits in which the main axis is L42 being approximately the same direction as the normal direction of the exiting face of the second lens sheet 8, from the exiting face, with the directivity being spread at half angle ΦH. Then, the light emitted from the second lens sheet 8 passes through the first lens sheet 7, and travels towards the viewer. Here, ΦH is set at approximately from 40 degrees to 90 degrees. Moreover, the shape of the reflection means 83 and the forming method are similar to the case of the reflection means 62 in Embodiment 2 except for the incident angle of the light; therefore, the explanation is omitted. In addition, although each of L32, L42, and L52 has a certain angle spread, only representative directions in the angle spread are illustrated in FIG. 12.

Here, the Fresnel lens sheet 9 is explained in detail. In FIG. 12(a), although incident light that is incident on the position P7 in FIG. 11, in which the image height in the vertical orientation becomes relatively high, while the image width in the horizontal orientation becomes relatively narrow is explained, when the Fresnel lens sheet 9 is used, for example, light being incident on a position P8 in FIG. 11, in which the image height in both the vertical orientation and the horizontal orientation becomes larger, can be also traveled along the same direction as L22, which is the light traveling direction at the position P7.

Thus, by only the light that has passed through the Fresnel lens sheet 9, being made to be incident on the second lens sheet 8 and the first lens sheet 7, the light traveling path can be corrected, while maintaining the optical axis of the incident light, and needed directivity can be also given. Therefore, the uniform diffusion directivity can be given to the light, over the entire screen.

Here, because the Fresnel lens sheet 9 whose focusing function is nil as described above can prevent the effect of refraction on the incident face, it is particularly effective, when the incident angle of the incident light is relatively large. That is, when the Fresnel lens sheet 9 is used, because the light projection means 1 and the rear-projection screen 23 can be arranged proximate to each other, the installation space can be substantially reduced. Moreover, efficiency in which the light projected from the light projection means 1 is incident on the second lens sheet 8 can be increased.

Figure 13:
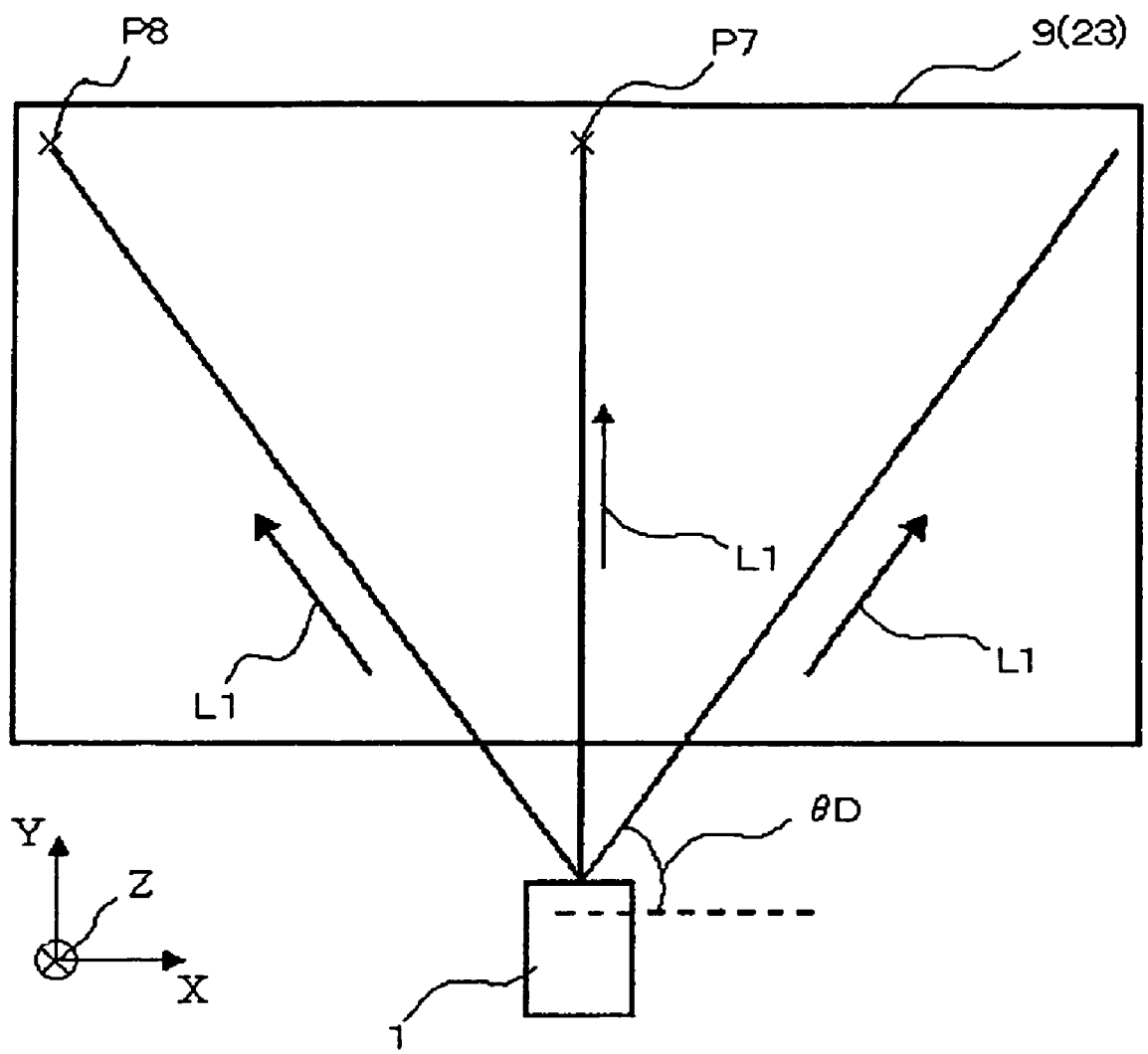
FIG. 13 is an explanatory view for explaining incident positions of incident light in the rear-projection screen according to Embodiment 3 of the present invention.

FIG. 13 is a front view in which the rear-projection screen 23 is viewed from the side of the light projection means 1. In FIG. 13, as an example, optical paths of the light that is incident on the position P7 and the position P8 are illustrated. In addition, θD is an angle between a line obtained by a line in parallel with the projection light being projected onto the X-Y plane and the X-axis. That is, θD corresponding to projected light traveling towards the position P7 that lies at the upper center of the rear-projection screen 23 becomes 90 degrees, meanwhile θD corresponding to projected light traveling towards the position P8 that lies proximately at the corner portion of the rear-projection screen 23 has a predetermined angle. However, in the following explanation, a case in which θD corresponding to light being incident at the position P8 is 45 degrees is explained.

Figure 14:
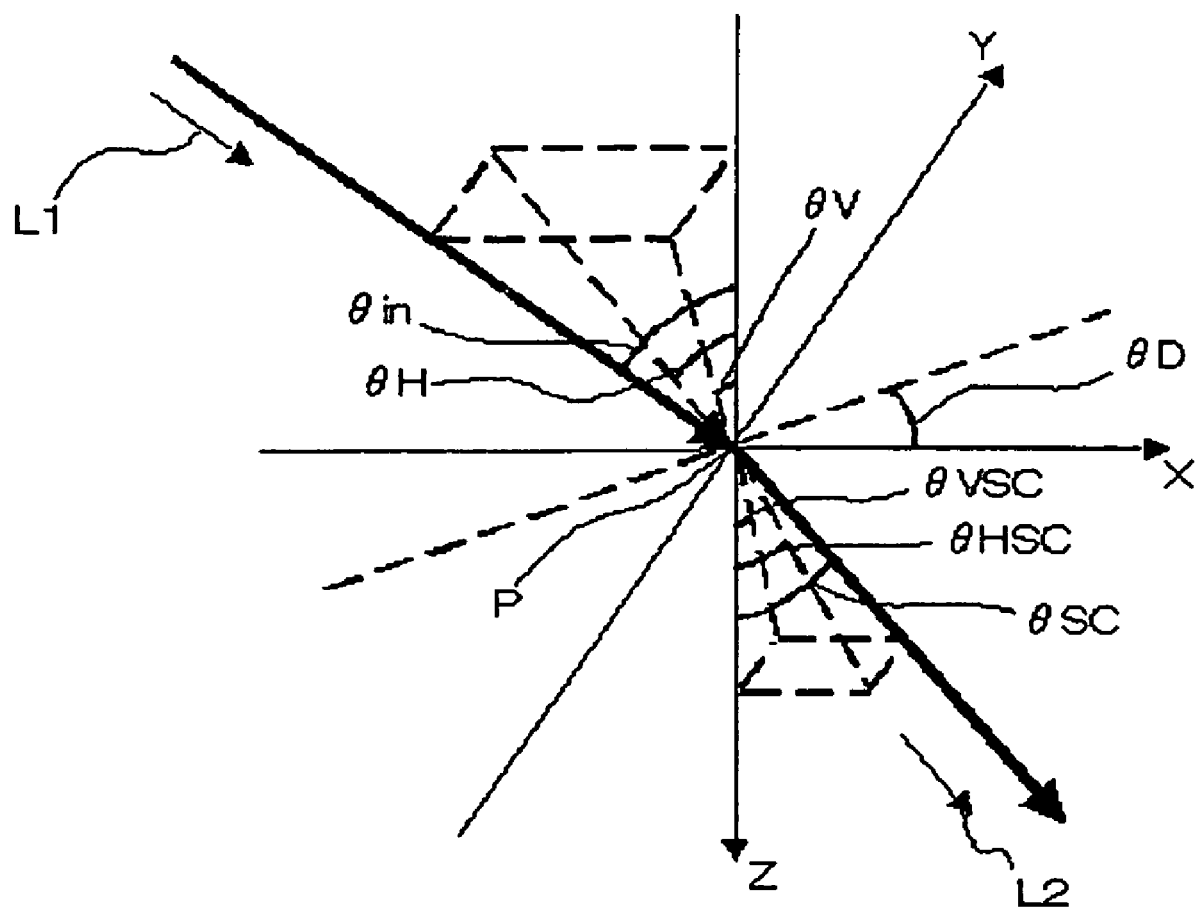
FIG. 14 is an explanatory view for explaining light traveling directions before and after the light is incident at a light incident position on the rear-projection screen according to Embodiment 3 of the present invention.

FIG. 14 is a view illustrating light traveling paths before and after the light is incident on a position where the light is incident on the rear-projection screen 23. Here, in FIG. 14, θin denotes an angle between the incident light traveling direction L1 and the Z-axis, θH denotes an angle between the direction in which the incident light traveling direction L1 is projected onto the X-Z plane and the Z-axis, and θV denotes an angle between the direction in which the incident light traveling direction L1 is projected onto the Y-Z plane and the Z-axis.

In addition, θSC denotes the angle between the light traveling direction L2 in the rear-projection screen 23 and the Z-axis, θHSC denotes the angle between the direction in which the light traveling direction L2 is projected onto the X-Z plane and the Z-axis, and θVSC denotes an angle between the direction in which L2 is projected onto the Y-Z plane and the Z-axis. Moreover, in the Z-axis direction, the range of Z<0 corresponds to the space outside the rear-projection screen 23 (the side of the light projection means 1), the range of Z>0 corresponds to the interior of the rear-projection screen 23, and the position of Z=0 corresponds to the incident face of the rear-projection screen 23. Here, in FIG. 14, detailed constitution, etc. of the rear-projection screen 23 are omitted as a matter of convenience.

Here, θin and θSC according to the refraction law are determined in such a way that a local face-normal-line (a face-normal-line of the Fresnel lens portion 92) is determined with respect to the reference that corresponds to a tilt of a local incident-face of the screen (a tilt of the Fresnel lens portion 92 in the Fresnel lens sheet 9), and other angles are determined with respect to the Z-axis as the reference, which is in the same orientation as the normal line of the incident face on the rear-projection screen 23.

In addition, the relative positional relationship between the light projection means 1 and the rear-projection screen 23 is assumed to be fixed. Accordingly by an arbitrary position such as the position P7 or the position P8 on the screen being made to be the coordinate-axis origin P, a unique incident angle θin of the incident light beam is determined with respect to the position.

In FIG. 15, θD, θH, θV, θin, θSC, θHSC, and θVSC are represented at the position P7 and the position P8. Moreover, columns 141 in FIG. 15 represent each value of θD, θH, θV, θin, θSC, θHSC, and θVSC at the position P7 and the position P8 in the rear-projection screen 23 according to Embodiment 3; meanwhile, a columns 142 represent each value of θD, θH θV, θin, θSC, θHSC, and θVSC in a case in which the Fresnel lens sheet 9 in the rear-projection screen 23 in Embodiment 3 is not provided, that is, in a case in which the rear-projection screen is composed only of the first lens sheet 7 and the second lens sheet 8.

Here, given that the refractive index of air is N1, and the refractive index of material forming the rear-projection screen is N2, according to the Snell's law, N1×sin(θin)=N2× sin(θSC) is satisfied. On the incident face of the rear-projection screen 23 according to Embodiment 3, the Fresnel lens sheet 9 is provided, and the incident face is, from a local viewpoint, perpendicular to the incident light traveling direction. Therefore, the values θin and θSC on the columns 141 in FIG. 15 become nil. This means that the incident light straightly travels into the inner portion of the Fresnel lens 9, when the light is incident on the Fresnel lens 9. Then, in this case, the values of θHSC and θVSC become the same values as those of θH and θV, respectively. As a result, the traveling angles θVSC in the perpendicular direction at both the position P7 and the position P8 coincide to be 45 degrees.

On the other hand, in a case in which the Fresnel lens sheet 9 is not provided on the rear-projection screen, because the incident face is planer (the X-Y plane), θin, from a geometrical calculation, becomes 45 degrees at the position P7, while θin becomes 54.7 degrees at the position P8. As a result, θSC, according to the Snell's law, becomes 28.1 degrees at the position P7, and 33.0 degrees at the position P8.

Moreover, θVSC in the rear-projection screen, according to the geometrical calculation, becomes 28.1 degrees at the position P7, and 24.6 degrees at the position P8; consequently, the difference of 3.5 degrees between the position P7 and the position P8 occurs. This angle difference occurs, due to non-linear optical path bending caused by refracting characteristics in relation to the incident angle increase when light is incident on the rear-projection screen, by the optical axis of the exiting light varying in accordance with the image height difference in the screen. If the light traveling angles θVSC thus differ from each other in the interior of the rear-projection screen, because the directivity centers of exiting light differ from position to position on the screen, the entire screen cannot be uniformly seen.

However, as explained above, according to the rear-projection screen 23 in Embodiment 3, because any light refraction does not occur except for the exiting face of the first lens sheet 7 in the rear-projection screen 23, even when the incident angle of projected light is relatively large, uniform directivity can be obtained over the entire screen. Therefore, the entire images projected by the light projection means 1 can be displayed with uniform brightness as well as excellent image quality.

Moreover, according to the rear-projection screen 23 in Embodiment 3, because the Fresnel lens sheet 9 selectively passes the projected light therethrough, light losses due to the incident light reflecting on the incident face of the rear-projection screen can be prevented. Therefore, because uniform brightness can be obtained over the entire screen, easy-to-view images with relatively high contrast can be displayed even in bright surroundings.

Here, in the rear-projection screen 23 according to Embodiment 3, the shapes, tilts, and slits of the reflection means 73 and the reflection means 83 can be determined so that the light directivity passing through the rear-projection screen 23 becomes uniform over the entire screen, that is, the values of ΦV and ΦH become equal. Moreover, even if the shape, tilt, and gap of the reflection means 73 are varied, the needed ΦV is obtained without affecting ΦH meanwhile, even if the shape, tilt, and gap of the reflection means 83 are varied, the needed ΦH is obtained without affecting ΦV. In addition, in the Fresnel lens sheet, because the incident face (the Fresnel lens portion 92) is approximately perpendicular to the traveling direction L1 of the projected light, there is little effect by the refraction. Therefore, even if the image height varies, the traveling direction of the incident light beam in the screen interior does not vary.

In the rear-projection screen 23 according to Embodiment 3, black stripes may be provided on the exiting face of either the first lens sheet 8 or the second lens sheet 9; in these cases, because any external light or stray light can be absorbed, further clear and high-contrast images can be displayed.

Moreover, by the Fresnel lens sheet 9 in Embodiment 3 being provided on the incident face side of the light deflector 4 explained in Embodiment 1, a rear-projection screen can also be constituted.

Furthermore, although in Embodiments 1-3, cases in which the cross-sectional shapes of the reflection means 42, 52, and 62 are a parabolic curve (face) are explained, the cross-sectional shapes of the reflection means 42, 52, and 62 may be a part of an elliptic curve (face), a hyperbolic curve (face), etc.

What is claimed is:

1. A light deflector in a rear-projection screen defining a light-incident side and a light-exiting side, the deflector comprising:
   a plurality of reflectors arranged side-by-side in a predetermined orientation along a length of said rear-projection screen, each reflector having
      a first reflection face, provided on the deflector light-incident side, for reflecting incident light so as to focus the light, and
      a second reflection face, provided on the deflector light-exiting side, for reflecting light reflected by the first reflection face of an adjacent reflector,
   the plurality of reflectors being arranged so that incident light reflected by the first reflection face of one of the plurality of reflectors is reflected by the second reflection face of another reflector adjacent to the one of the reflectors.

2. A light deflector as recited in claim 1, wherein in each reflector a component on which the first reflection face is provided and a component on which the second reflection face is provided are integrally composed.

3. A light deflector as recited in claim 2, wherein the first reflection face and the second reflection face on each reflector are in a front/back relationship.

4. A light deflector as recited in claims 1, wherein:
   a shape of each first reflection face, in a cross-section through the deflector along the predetermined orientation is a portion of a quadratic curve having a focal point, and
   a peak of the quadratic curve is directed towards the light-exiting side.

5. A rear-projection screen comprising:
   a light deflector as recited in claim 1; and
   a light transmitter, having a face that is approximately perpendicular to an optical axis of incident light, for selectively transmitting the incident light through the face.

6. A rear-projection screen comprising:
   a plurality of light deflectors as recited in claim 1, in which plurality of the reflectors are present extending along a direction perpendicular to the predetermined orientation, wherein:
      the light deflectors in the plurality are adjacently arranged so that the light-exiting side of one light deflector and the light-incident side of another light deflector face onto each other, and
      the one light deflector is arranged in such a way that a focal line defined by focal points of the first or second reflection faces of each reflector in that light deflector is rotated relative to the focal line of the other light deflector by a predetermined angle around an axis parallel to the orientation in which light-exiting and light-incident sides face on each other.

7. A rear-projection screen as recited in claim 6, wherein said plurality of light deflectors numbers two, and the predetermined angle is 90 degrees.

8. A rear-projection screen as recited in claim 6, wherein the rear-projection screen has,
   on the incident-light side of the one light deflector, a face approximately perpendicular to the optical axis of light incident into every point on the screen, and
   a light transmitter selectively transmitting the incident light through the face.

9. A light deflector defining a light-incident side and a light-exiting side, the deflector comprising:
   a plurality of reflectors arranged side-by-side in a predetermined orientation, each reflector having
      a first reflection face, provided on the deflector light-incident side, for reflecting incident light so as to focus the light, and
      a second reflection face, provided on the deflector light-exiting side, for reflecting light reflected by the first reflection face of an adjacent reflector, the plurality of reflectors being arranged so that incident light reflected by the first reflection face of one of the plural reflector is reflected by the second reflection face of another reflector adjacent to the one of the reflector wherein,
      a shape of each first reflection face, in a cross-section through the deflector along the predetermined orientation is a portion of a first quadratic curve having a focal point, wherein the shape of each second reflection face, in a cross-section through the deflector along the predetermined orientation is a portion of a second quadratic curve having a focal point, and
      a peak of the second quadratic curve is directed towards the light-exiting side, wherein the peak of the first quadratic curve is directed towards the light-incident side, and the focal point of the second quadratic curve lies at the same point as the focal point of the quadratic curve corresponding to its adjacent first reflection face.

10. A light deflector as recited in claim 9, wherein the cross-sectional shape that the first reflection face has, or the cross-sectional shape that the second reflection face has is a portion of a parabolic curve.

11. A light deflector as recited in claim 9, wherein the cross-sectional shape that the first reflection face has, or the cross-sectional shape that the second reflection face has is a portion of an elliptic curve.

* * * * *